(12) United States Patent
Veysi et al.

(10) Patent No.: US 12,046,910 B2
(45) Date of Patent: Jul. 23, 2024

(54) DEVICES AND SYSTEMS FOR PROVIDING WIRELESSLY CHARGEABLE BATTERIES WITH IMPROVED CHARGE CAPACITIES

(71) Applicant: Ossia Inc., Bellevue, WA (US)

(72) Inventors: Mehdi Veysi, Bellevue, WA (US); Caner Guclu, Bellevue, WA (US); Matthew William Colleen, Seattle, WA (US); Cosan Caglayan, Bellevue, WA (US); Hatem Ibrahim Zeine, Bellevue, WA (US); Tanner Theel, Seattle, WA (US); James J. Wojcik, Prior Lake, MN (US)

(73) Assignee: Ossia Inc., Redmond, WA (US)

( * ) Notice: Subject to any disclaimer, the term of this patent is extended or adjusted under 35 U.S.C. 154(b) by 585 days.

(21) Appl. No.: 17/183,222

(22) Filed: Feb. 23, 2021

(65) Prior Publication Data
US 2021/0265870 A1 Aug. 26, 2021

Related U.S. Application Data

(60) Provisional application No. 62/980,723, filed on Feb. 24, 2020.

(51) Int. Cl.
*H02J 50/00* (2016.01)
*H01Q 1/38* (2006.01)
(Continued)

(52) U.S. Cl.
CPC .............. *H02J 50/005* (2020.01); *H01Q 1/38* (2013.01); *H01Q 9/0428* (2013.01); *H01Q 9/16* (2013.01);
(Continued)

(58) Field of Classification Search
CPC ...................................................... H02J 50/005
(Continued)

(56) References Cited

U.S. PATENT DOCUMENTS 3,921,298 A * 11/1975 Fattaleh .................. A61C 3/00
433/110
5,982,103 A 11/1999 Mosebrook et al.
(Continued)

FOREIGN PATENT DOCUMENTS

CN 101401312 4/2009
CN 101598264 12/2009
(Continued)

OTHER PUBLICATIONS

Japanese Patent Application No. 2020-109328, Office Action, 7 pages, dated Jul. 6, 2021.
(Continued)

*Primary Examiner* — Jerry D Robbins

(57) ABSTRACT

An enclosure for a wirelessly chargeable battery includes a housing having a base and an opposing open end, where a hole is bored through the base. The enclosure includes an end piece attached to the housing proximal the base and having an opposing open end. The enclosure includes a first conductive coating formed on an interior surface of the housing and a first surface of the base, and a second conductive coating formed on an interior surface of the end piece and a second surface of the base, where the housing and the end piece are configured in dimensions that conform to standardized battery dimensions. Battery cell(s) may be positioned inside a cavity in the housing, and circuitry may be positioned inside a cavity of the end piece. The enclosure enables highly efficient use of interior space and volume of the enclosure to maximize battery charge capacity.

24 Claims, 20 Drawing Sheets

(51) Int. Cl.
  *H01Q 9/04* (2006.01)
  *H01Q 9/16* (2006.01)
  *H01Q 9/30* (2006.01)
  *H02J 7/00* (2006.01)
  *H02J 7/02* (2016.01)
  *H02J 50/23* (2016.01)
  *H02J 50/40* (2016.01)
  *H02J 50/80* (2016.01)
  *H01Q 21/00* (2006.01)

(52) U.S. Cl.
  CPC ............ *H01Q 9/30* (2013.01); *H02J 7/0042* (2013.01); *H02J 7/02* (2013.01); *H02J 50/001* (2020.01); *H02J 50/23* (2016.02); *H02J 50/402* (2020.01); *H02J 50/80* (2016.02); *H01Q 21/00* (2013.01)

(58) Field of Classification Search
  USPC ........................................................ 320/108
  See application file for complete search history.

(56) References Cited

U.S. PATENT DOCUMENTS

| | | | |
|---|---|---|---|
| 6,178,140 B1 | 1/2001 | Schlieter | |
| 6,208,115 B1* | 3/2001 | Binder | H02J 7/02 429/10 |
| 6,316,915 B1 | 11/2001 | Fujiwara et al. | |
| 6,448,490 B1 | 9/2002 | Katz | |
| 6,647,483 B1 | 11/2003 | Hoglund et al. | |
| 6,661,197 B2 | 12/2003 | Zink et al. | |
| 7,042,196 B2 | 5/2006 | Cheng et al. | |
| 7,388,350 B1* | 6/2008 | Wright | G08C 23/04 429/98 |
| 7,525,283 B2 | 4/2009 | Cheng et al. | |
| 8,010,205 B2 | 8/2011 | Rahman et al. | |
| 8,072,380 B2 | 12/2011 | Crouch | |
| 8,159,364 B2 | 4/2012 | Zeine | |
| 8,310,201 B1* | 11/2012 | Wright | H02J 7/0045 320/108 |
| 8,410,953 B2 | 4/2013 | Zeine | |
| 8,446,248 B2 | 5/2013 | Zeine | |
| 8,460,816 B2 | 6/2013 | Julstrom et al. | |
| 8,558,661 B2 | 10/2013 | Zeine | |
| 8,587,154 B2 | 11/2013 | Fells et al. | |
| 8,853,891 B2 | 10/2014 | Soar | |
| 8,854,176 B2 | 10/2014 | Zeine | |
| 8,896,315 B1 | 11/2014 | Davies | |
| 9,167,228 B2* | 10/2015 | Monari | H04N 23/661 |
| 9,452,296 B2 | 9/2016 | Forsell | |
| 9,477,292 B1 | 10/2016 | Murali | |
| 9,774,210 B1 | 9/2017 | Wright | |
| 10,079,494 B2 | 9/2018 | Zeine et al. | |
| 10,122,415 B2 | 11/2018 | Bell et al. | |
| 10,424,971 B2 | 9/2019 | Renneberg et al. | |
| 10,559,971 B2 | 2/2020 | Zeine et al. | |
| 2002/0080083 A1 | 6/2002 | Nantz et al. | |
| 2003/0027036 A1 | 2/2003 | Emori et al. | |
| 2003/0153266 A1 | 8/2003 | Kim et al. | |
| 2003/0220092 A1 | 11/2003 | Hethuin et al. | |
| 2005/0136845 A1 | 6/2005 | Masuoka et al. | |
| 2005/0275983 A1 | 12/2005 | Franklin et al. | |
| 2006/0192532 A1 | 8/2006 | Oba et al. | |
| 2006/0285692 A1 | 12/2006 | Kerstens et al. | |
| 2007/0008132 A1 | 1/2007 | Bellantoni | |
| 2007/0222415 A1 | 9/2007 | Shah et al. | |
| 2007/0222681 A1* | 9/2007 | Greene | H02J 50/005 343/702 |
| 2008/0058029 A1 | 3/2008 | Sato et al. | |
| 2008/0217309 A1 | 9/2008 | Rodgers | |
| 2009/0058361 A1* | 3/2009 | John | A61N 1/3785 307/104 |
| 2009/0085527 A1 | 4/2009 | Odaohhara | |
| 2009/0096422 A1 | 4/2009 | Trattler | |
| 2009/0102703 A1 | 4/2009 | Mohamadi et al. | |
| 2009/0117855 A1 | 5/2009 | Rofougaran | |
| 2009/0159330 A1* | 6/2009 | Weinstein | H01M 10/425 29/464 |
| 2010/0041349 A1 | 2/2010 | Mahany et al. | |
| 2010/0117373 A1* | 5/2010 | Mochida | H02K 7/1876 290/1 A |
| 2010/0141214 A1 | 6/2010 | Yoon et al. | |
| 2010/0178919 A1 | 7/2010 | Deepak et al. | |
| 2010/0181962 A1* | 7/2010 | Chen | H02J 7/0042 320/108 |
| 2010/0259401 A1 | 10/2010 | Azaneot et al. | |
| 2010/0328073 A1 | 12/2010 | Nikitin et al. | |
| 2011/0086256 A1* | 4/2011 | Julstrom | H01M 10/425 429/121 |
| 2011/0103517 A1 | 5/2011 | Hamalainen | |
| 2011/0111700 A1 | 5/2011 | Hackett | |
| 2011/0210697 A1 | 9/2011 | Yin et al. | |
| 2011/0228436 A1 | 9/2011 | Lee et al. | |
| 2011/0241617 A1 | 10/2011 | Hoffman et al. | |
| 2012/0001644 A1 | 1/2012 | Baarman et al. | |
| 2012/0001647 A1 | 1/2012 | Baarman et al. | |
| 2012/0153740 A1 | 6/2012 | Soar | |
| 2012/0187851 A1 | 7/2012 | Huggins et al. | |
| 2012/0262004 A1 | 10/2012 | Cook et al. | |
| 2012/0274154 A1 | 11/2012 | Deluca | |
| 2012/0276854 A1 | 11/2012 | Joshi et al. | |
| 2012/0302297 A1 | 11/2012 | Patel et al. | |
| 2013/0026981 A1 | 1/2013 | Van Der Lee | |
| 2013/0106661 A1 | 5/2013 | Xiang | |
| 2013/0154892 A1 | 6/2013 | Zeltser et al. | |
| 2013/0175982 A1* | 7/2013 | Teggatz | H02J 50/70 320/108 |
| 2013/0273870 A1 | 10/2013 | Shi | |
| 2013/0328416 A1 | 12/2013 | Whitworth et al. | |
| 2014/0002012 A1* | 1/2014 | McCauley | H01F 38/14 320/108 |
| 2014/0009364 A1 | 1/2014 | Yehezkely | |
| 2014/0015344 A1 | 1/2014 | Mohamadi | |
| 2014/0035524 A1 | 2/2014 | Zeine | |
| 2014/0091626 A1 | 4/2014 | Walley et al. | |
| 2014/0091636 A1 | 4/2014 | Ofstein et al. | |
| 2014/0091756 A1 | 4/2014 | Ofstein et al. | |
| 2014/0117928 A1 | 5/2014 | Liao | |
| 2014/0154535 A1 | 6/2014 | Olsson et al. | |
| 2014/0217967 A1 | 8/2014 | Zeine et al. | |
| 2014/0232330 A1 | 8/2014 | Robertson et al. | |
| 2014/0252869 A1 | 9/2014 | Kamiura et al. | |
| 2014/0266103 A1 | 9/2014 | Wang et al. | |
| 2014/0268519 A1 | 9/2014 | Huang et al. | |
| 2014/0302869 A1 | 10/2014 | Rosenbaum et al. | |
| 2014/0361735 A1 | 12/2014 | Li et al. | |
| 2015/0001949 A1 | 1/2015 | Leabman et al. | |
| 2015/0022022 A1 | 1/2015 | Zeine | |
| 2015/0035472 A1 | 2/2015 | Yang | |
| 2015/0042526 A1 | 2/2015 | Zeine | |
| 2015/0048785 A1 | 2/2015 | Roohparvar et al. | |
| 2015/0102764 A1 | 4/2015 | Leabman et al. | |
| 2015/0102769 A1 | 4/2015 | Leabman et al. | |
| 2015/0155736 A1 | 6/2015 | Sun et al. | |
| 2015/0162763 A1 | 6/2015 | Kimura et al. | |
| 2015/0222129 A1 | 8/2015 | McCauley et al. | |
| 2015/0340910 A1 | 11/2015 | Petras et al. | |
| 2015/0365003 A1 | 12/2015 | Sadwick | |
| 2015/0380954 A1 | 12/2015 | Poulton | |
| 2016/0013678 A1 | 1/2016 | Bell et al. | |
| 2016/0020638 A1 | 1/2016 | Hemesath et al. | |
| 2016/0033254 A1 | 2/2016 | Zeine et al. | |
| 2016/0062376 A1 | 3/2016 | Kim et al. | |
| 2016/0191121 A1 | 6/2016 | Bell et al. | |
| 2016/0299210 A1 | 10/2016 | Zeine | |
| 2016/0299549 A1 | 10/2016 | Zeine et al. | |
| 2016/0301217 A1 | 10/2016 | Zeine et al. | |
| 2016/0301240 A1* | 10/2016 | Zeine | H02J 50/20 |
| 2016/0301259 A1 | 10/2016 | Zeine et al. | |
| 2016/0315495 A1* | 10/2016 | Lee | H01M 10/425 |
| 2017/0085117 A1* | 3/2017 | Ota | H02J 50/80 |
| 2017/0141621 A1 | 5/2017 | Zeine et al. | |
| 2017/0179771 A1 | 6/2017 | Leabman | |

(56) References Cited

U.S. PATENT DOCUMENTS

| | | |
|---|---|---|
| 2017/0180075 A1 | 6/2017 | Gollakota et al. |
| 2017/0187249 A1 | 6/2017 | Zeine et al. |
| 2017/0229898 A1 | 8/2017 | Chen et al. |
| 2018/0041241 A1 | 2/2018 | Trotta et al. |
| 2018/0102655 A1 | 4/2018 | Miller et al. |
| 2018/0278200 A1 | 9/2018 | Jeon et al. |
| 2018/0331586 A1 | 11/2018 | Hao et al. |
| 2019/0088955 A1* | 3/2019 | Bakker ............... H01M 10/36 |
| 2020/0303954 A1 | 9/2020 | Zeine et al. |
| 2022/0037705 A1* | 2/2022 | Iqbal .................. G08B 3/10 |

FOREIGN PATENT DOCUMENTS

| | | |
|---|---|---|
| CN | 201877893 | 6/2011 |
| EP | 2363906 | 9/2011 |
| EP | 3281272 | 2/2020 |
| EP | 3709474 | 10/2020 |
| JP | 10-295043 | 11/1998 |
| JP | 2004-102898 | 4/2004 |
| JP | 2004-193701 A | 7/2004 |
| JP | 2005-117748 A | 4/2005 |
| JP | 2008-235022 A | 10/2008 |
| JP | 2008235022 | 10/2008 |
| JP | 2009-530964 A | 8/2009 |
| JP | 2010-19370 A | 9/2010 |
| JP | 2013-38967 | 2/2013 |
| KR | 2011-0135507 | 12/2011 |
| KR | 10-1499770 | 3/2015 |
| KR | 10-2020-0006123 A | 1/2020 |
| WO | 9858437 | 12/1998 |
| WO | 20130142720 | 9/2013 |
| WO | 2014055658 | 4/2014 |
| WO | 2017063868 | 4/2017 |

OTHER PUBLICATIONS

Extended European Search Report for EP Application 16777118.7 dated Oct. 24, 2018; 8 pages.
International Search Report and Written Opinion for PCT/US2021/019422, filed Feb. 24, 2021, dated Jun. 15, 2021; 12 pages.
Japan Office Action for JP Application No. 2017-0552036, dated Nov. 26, 2019; 6 pages.
Japan Office Action for JP Application No. 2017-552036; dated Oct. 30, 2018; 12 pages.
China Office Action for China Application No. 201680032910.5, filed Apr. 4, 2016; dated Jun. 19, 2020; 9 pages.
Japan Office Action for Japan Application No. 2017-552036, filed Apr. 4, 2016; dated Nov. 26, 2019; 6 pages.
Korea Office Action for Korea Application No. 2017-7032541, filed Apr. 4, 2016; dated Dec. 3, 2019; 9 pages.
International Search Report and Written Opinion for PCT Application No. PCT/US2017/063868 filed Nov. 30, 2017; dated Mar. 19, 2018; 18 pages.
European Patent Application No. 20156711.2, Extended European Search Report, 14 pages, Sep. 28, 2020.
Japanese Patent Application No. 2020-109328, Notice of Allowance, 6 pages, Feb. 22, 2022.

* cited by examiner

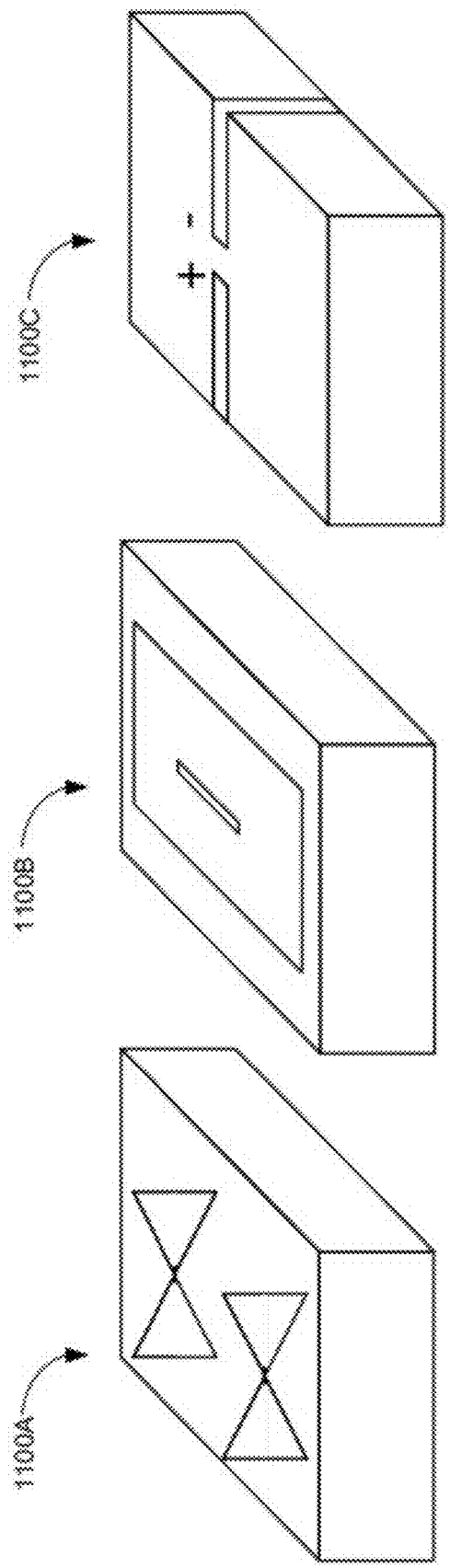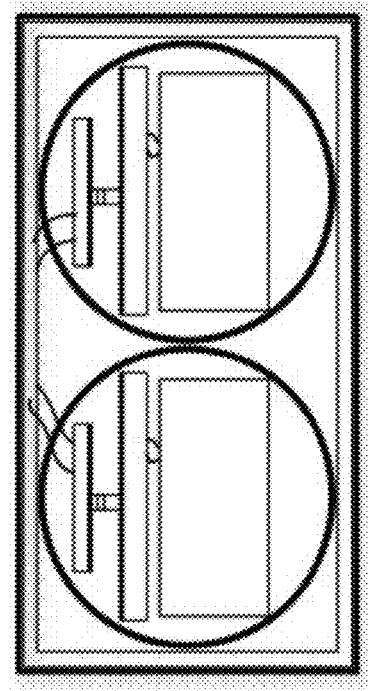
*FIG. 11A*
*FIG. 11B*
*FIG. 11C*
*FIG. 11D*

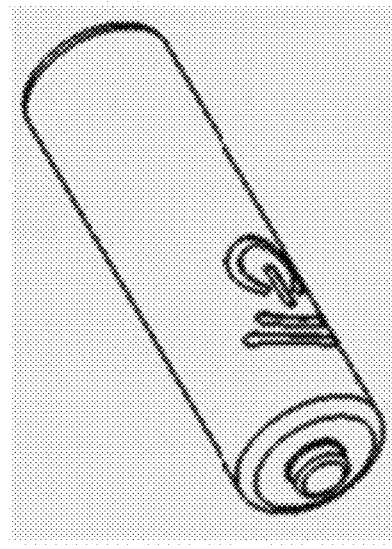
*FIG. 13A*
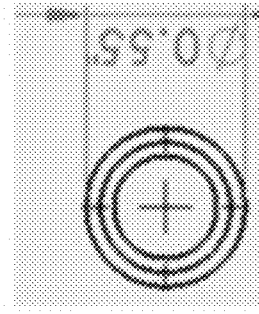
*FIG. 13B*
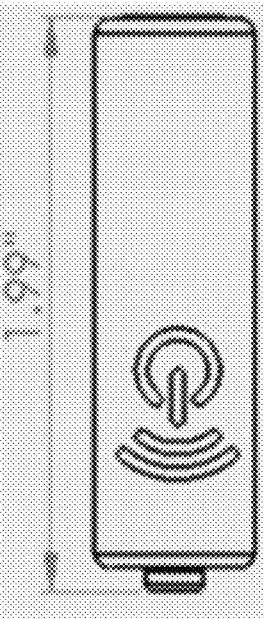
*FIG. 13C*
*FIG. 13D*

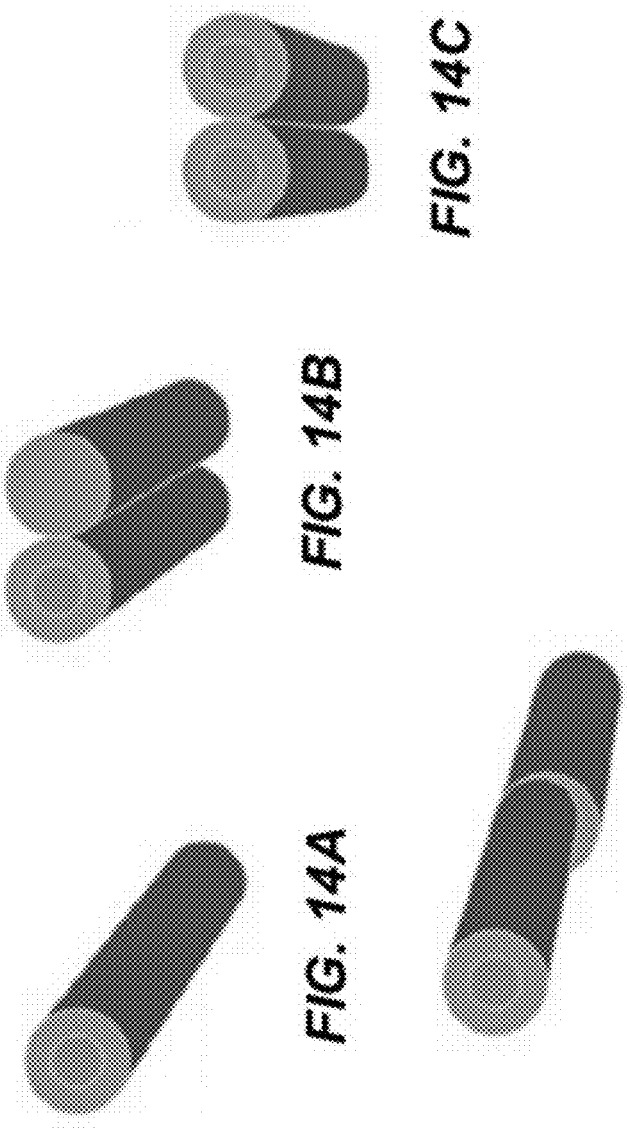

1

DEVICES AND SYSTEMS FOR PROVIDING WIRELESSLY CHARGEABLE BATTERIES WITH IMPROVED CHARGE CAPACITIES

CROSS-REFERENCE TO RELATED APPLICATIONS

This application claims priority to U.S. Provisional Application Ser. No. 62/980,723 filed Feb. 24, 2020, which is incorporated herein by reference in its entirety for all purposes.

BACKGROUND

The use of mobile communication devices (or mobile devices), such as personal data assistants (PDAs), cell phones (including smart phones or mobile phones), and tablet computers, is ubiquitous. These devices must be supplied with electricity to function and typically include rechargeable batteries to enable portability. The rechargeable batteries are typically recharged through the use of battery chargers which plug into a port on the mobile device and to an electrical outlet to facilitate the transfer of electrical power. Moreover, in some cases, such as with rechargeable AA batteries, a device might be completely dysfunctional when the batteries are removed and placed on an external charger. Consequently, when a mobile device is charging or when batteries are charging, the device essentially becomes tethered to the wall and its portability aspect is lost for the duration of time the battery is recharged.

Wireless charging functionality can be added to devices through the use of various wireless power receiver components, such as those made and designed by Ossia, Inc. Unfortunately, it is time consuming, difficult and expensive to integrate product enhancements, such as wireless charging functionality, into existing wireless devices as the enhancements can require extensive internal and/or external redesign. Designing wirelessly rechargeable batteries to maximize use of available space and volume, while also maximizing the charge storage capacity, for standardized battery sizes and form factors in non-trivial.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

A first aspect of the present technology provides an enclosure for a wirelessly chargeable battery. The enclosure includes a housing having a base and an open end opposite the base. The base has a first surface and a second surface. The first surface of the base faces the open end of the housing. The base includes a hole bored therethrough. The enclosure includes an end piece attached to the housing proximal to the base. The end piece has an open end positioned opposite the second surface of the base. The enclosure includes an antenna attached to or formed on at least one of: an interior surface, and an exterior surface, of at least one of: the housing, and the end piece.

In a first embodiment of the enclosure according to the first aspect of the present technology, the housing, the base, and the end piece may be formed as a one-piece construction. In the first, or in a second, embodiment of the enclosure according to the first aspect of the present technology, the antenna may be further attached to or formed on an interior surface of the holed bored through the base. In the first, second, or in a third, embodiment of the enclosure according to the first aspect of the present technology, the antenna may be further attached to or formed on an exterior surface of the open end of the housing opposite the first surface of the base. In any of the first through third, or in a fourth, embodiment of the enclosure according to the first aspect of the present technology, the antenna may be further attached to or formed on an exterior surface of the open end of the end piece opposite the second surface of the base.

In any of the first through fourth, or in a fifth, embodiment of the enclosure according to the first aspect of the present technology, the antenna may be further attached to or formed on the interior surface the end piece, where the antenna may be electrically connected to one or more components positioned inside of the housing via at least one elastomeric connection. In any of the first through fifth, or in a sixth, embodiment of the enclosure according to the first aspect of the present technology, the antenna may include at least two electrically isolated antenna portions. In any of the first through sixth, or in a seventh, embodiment of the enclosure according to the first aspect of the present technology, the enclosure may further include a plurality of directors positioned on the exterior surface of at least one of the housing and the end piece. In any of the first through seventh, or in an eighth, embodiment of the enclosure according to the first aspect of the present technology, at least one of: the housing, and the end piece, may be constructed of a radio frequency transparent material.

A second aspect of the present technology provides a wirelessly chargeable battery apparatus. The apparatus includes a housing having a base and an open end opposite the base. The base has a first surface and a second surface. The first surface of the base faces the open end of the housing. The base includes a hole bored therethrough. The apparatus includes an end piece attached to the housing proximal to the base. The end piece has an open end positioned opposite the second surface of the base. The apparatus includes an antenna attached to or formed on at least one of: an interior surface, and an exterior surface, of the housing and the end piece. The apparatus includes at least one battery cell positioned in a first cavity defined by the housing and the first surface of the base. The apparatus includes circuitry positioned in a second cavity defined by the end piece and the second surface of the base. The circuitry is connected to the at least one battery cell.

In a first embodiment of the wirelessly chargeable battery apparatus according to the second aspect of the present technology, the circuitry may be connected to the at least battery cell by a wired connection extending from the first cavity through the hole to the second cavity. In the first, or in a second, embodiment of the apparatus according to the second aspect of the present technology, the apparatus may further include: a first cap attached to an exterior surface of the open end of the housing opposite the first surface of the base, and a second cap attached to an exterior surface of the open end of the end piece opposite the second surface of the base. The first cap may enclose the first cavity, and the second cap may enclose the second cavity. In the first, second, or in a third, embodiment of the apparatus according to the second aspect of the present technology, the antenna may include at least two electrically isolated antenna portions. In any of the first through third, or in a fourth, embodiment of the apparatus according to the second aspect of the present technology, the antenna may include a dipole-inspired antenna.

In any of the first through fourth, or in a fifth, embodiment of the wirelessly chargeable battery apparatus according to the second aspect of the present technology, the antenna may include a monopole-inspired antenna. In any of the first through fifth, or in a sixth, embodiment of the apparatus according to the second aspect of the present technology, the apparatus may further include radiator. The radiator may include a circularly polarized antenna. In any of the first through sixth, or in a seventh, embodiment of the apparatus according to the second aspect of the present technology, the apparatus may further include a plurality of conductor strips or planes positioned on the exterior surface of at least one of: the housing, and the end piece. In any of the first through seventh, or in an eighth, embodiment of the apparatus according to the second aspect of the present technology, the circuitry may be distributed across a plurality of stacked and connected printed circuit board (PCB) pieces. At least one of the PCB pieces may be embodied in a flexible PCB piece.

A third aspect of the present technology provides a method for manufacturing a wirelessly chargeable battery apparatus. The method includes the step of forming an enclosure including a first interior cavity separated from a second interior cavity by a base. The method includes the step of boring a hole through a portion of the base to provide access between the first and second cavities. The method includes the step of integrating an antenna into or onto at least one of: an interior surface, and an exterior surfaces of the enclosure.

In a first embodiment of the method for manufacturing a wirelessly chargeable battery apparatus according to the third aspect of the present technology, the step of integrating an antenna may include at least one of: coating an interior surface of the first cavity with a conductor, and coating an interior surface of the second cavity with the conductor. In the first, or in a second, embodiment of the method according to the third aspect of the present technology, the step of integrating an antenna may include: first coating an interior surface of the first cavity with a conductor, and second coating an interior surface of the second cavity with the conductor. After the first second coating steps, the first coating may be electrically isolated from the second coating.

In the first, second, or in a third, embodiment of the method for manufacturing a wirelessly chargeable battery apparatus according to the third aspect according to the third aspect of the present technology, the method may further include the steps of: positioning at least one battery cell in the first cavity, positioning circuitry in the second cavity, and connecting the at least one battery cell to the circuitry using a wired connection extending through the hole from the first cavity to the second cavity. In any of the first through third, or in a fourth, embodiment of the method according to the third aspect of the present technology, the circuitry may include a PCB, and the method may further include the step of coupling the antenna and the PCB via one or more elastomeric radio frequency connections.

BRIEF DESCRIPTION OF THE DRAWINGS

One or more embodiments of the present invention are illustrated by way of example and not limitation in the figures of the accompanying drawings, in which like references indicate similar elements.

FIGS. 11A-11D depict various front perspective views and a cross sectional top view, respectively, of example multi-wirelessly chargeable battery apparatus packages, according to some embodiments.

FIGS. 13A-13D illustrate various views of an example client (wireless power receiver) packaged in a standard battery form factor, according to some embodiment.

FIGS. 14A-14D illustrate various examples of multi-battery configurations, according to some embodiments.

DETAILED DESCRIPTION

Figure 1:
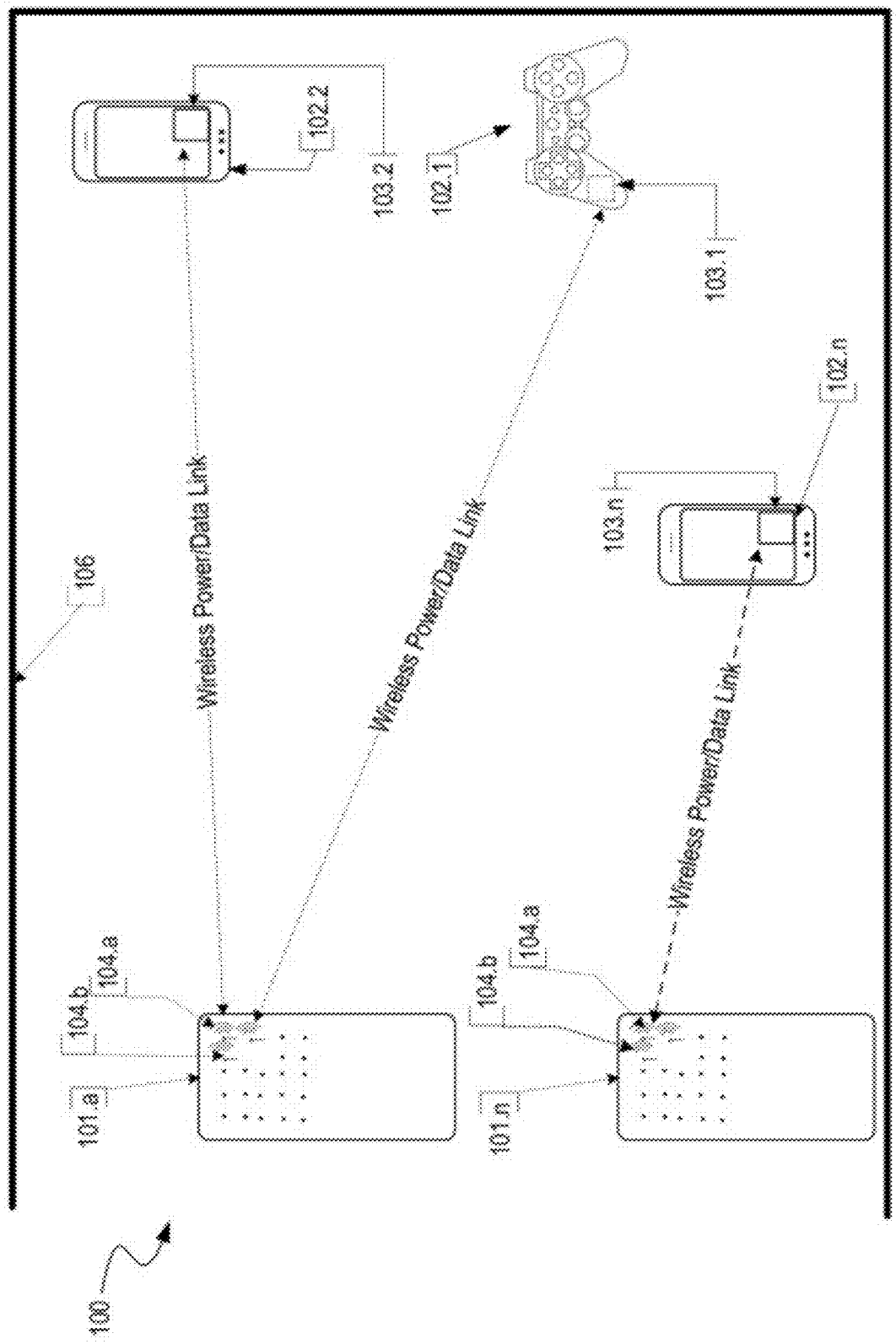
FIG. 1 depicts a block diagram illustrating an example wireless power delivery environment depicting wireless power delivery from one or more wireless chargers to various wireless devices within the wireless power delivery environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe systems, methods, apparatuses for wirelessly charging handheld and consumer electronics in wireless power delivery environments. In some embodiments, techniques are described for providing space and volume efficient enclosures for integrating wireless power receivers with battery cells into standardized battery sizes and form factors. For example, the apparatuses discussed herein allow any device that accepts standard form factor batteries to be transformed into a wirelessly powered device. The wirelessly rechargeable battery apparatuses can be applied to any battery form factor including custom or semi-custom battery form factors for mobile phones, laptops, tablet computers, etc. Advantageously, among other benefits, the apparatuses discussed herein overcome the product integration challenges discussed above and further enable providing wirelessly rechargeable batteries having greater charge capacity as compared to known devices and systems.

In some embodiments, the batteries with integrated wireless charging functionality can include one or more antennas. The antenna placement within the battery can be optimized for power reception performance and can vary based on the type of battery form factor. In some embodiments, parasitic antenna directors may be placed on exterior surfaces of the disclosed battery enclosures for optimizing antenna performance for both RF transmission and receipt purposes.

The embodiments described herein are primarily discussed with reference to AA battery form factors. However, it is appreciated that wireless battery apparatuses are configurable in any battery form factor and can be used in any device that requires a rechargeable or non-rechargeable battery.

I. Example Wireless Power Delivery System Overview/Architecture

FIG. 1 is a diagram illustrating an example wireless power delivery environment 100 depicting wireless power delivery from one or more wireless chargers 101 to various wireless devices 102 within the wireless power delivery environment 100. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive isolated wireless power from one or more wireless chargers 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. As discussed herein, the one or more integrated power receiver clients or "wireless power receivers" receive and process power from one or more transmitters/chargers 101.a-101.n and provide the power to the wireless devices 102.1-102.n for operation thereof.

Each charger 101 (also referred to herein as a "transmitter", "array of antennas" or "antenna array system") can include multiple antennas 104, e.g., an antenna array including hundreds or thousands of antennas, which are capable of delivering wireless power to wireless devices 102. In some embodiments, the antennas are adaptively-phased radio frequency (RF) antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein he term "array" or "array system" may be used include related and peripheral circuitry for signal generation, reception and transmission, such as radios, digital logic and modems. In some embodiments, the charger 101 can have an embedded Wi-Fi hub.

The wireless devices 102 can include one or more receive power clients 103. As illustrated in the example of FIG. 1, power delivery antennas 104a and data communication antennas 104b are shown. The power delivery antennas 104a are configured to provide delivery of wireless RF power in the wireless power delivery environment. The data communication antennas are configured to send data communications to and receive data communications from the power receiver clients 103.1-103 and/or the wireless devices 102.1-102.n. In some embodiments, the data communication antennas can communicate via Bluetooth, Wi-Fi, ZigBee, etc.

Each power receiver client 103.1-103.n includes one or more antennas (not shown) for receiving signals from the chargers 101. Likewise, each charger 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.a-101.n can be connected to a power source such as, for example, a power outlet or source connecting the chargers to a standard or primary alternating current (AC) power supply in a building. Alternatively, or additionally, one or more of the chargers 101.a-101.n can be powered by a battery or via other mechanisms.

In some embodiments, the power receiver clients 102.1-102.n and/or the chargers 101.a-101.n utilize reflective objects 106 such as, for example, walls or other RF reflective obstructions within range to transmit beacon signals and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.n can be any system and/or device, and/or any combination of devices/systems that can establish a connection with another device, a server and/or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.n can each include a data communication module for communication via a data channel. Alternatively, or additionally, the power receiver clients 103.1-103.n can direct the wireless devices 102.1-102.n to communicate with the charger via existing data communications modules. Additionally, in some embodiments the beacon signal, which is primarily referred to herein as a continuous waveform, can alternatively or additionally take the form of a modulated signal.

Figure 2:
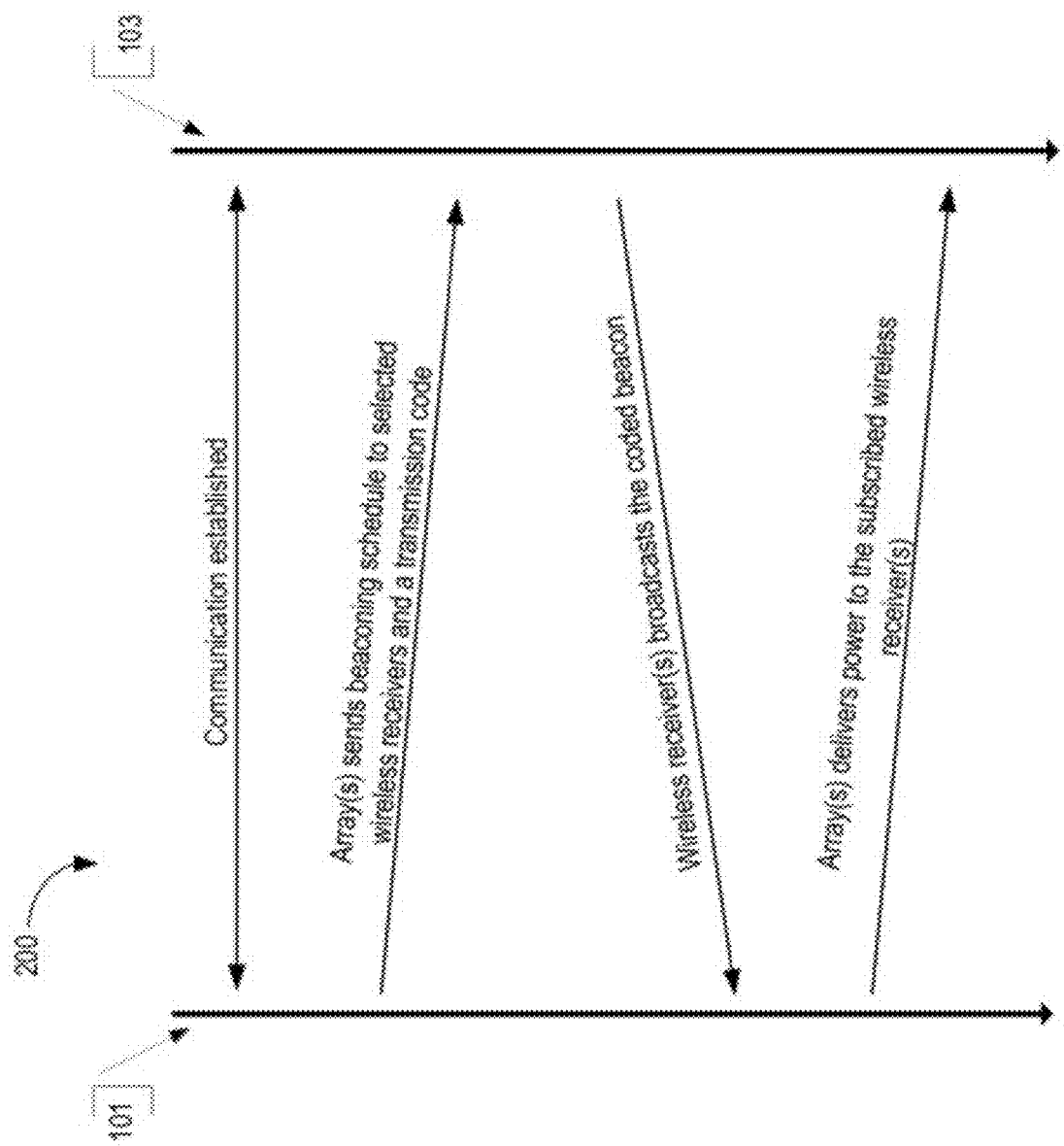
FIG. 2 depicts a sequence diagram illustrating example operations between a wireless charger and a wireless receiver device for commencing wireless power delivery in accordance with some embodiments.

FIG. 2 is a sequence diagram 200 illustrating example operations between a wireless charger 101 and a power receiver client 103 for commencing isolated wireless power delivery, according to an embodiment. Initially, communication is established between the charger 101 and the power receiver client 103. The charger 101 subsequently sends beacon schedule information and a transmission code to the power receiver client 103 to facilitate encoding of the beacon signal by the power receiver client 103 for subsequent isolated wireless power delivery by the charger. The charger 101 can also send power transmission scheduling information so that the power receiver client 103 knows when to expect wireless power from the charger. As discussed herein, the power receiver client 103 generates an encoded beacon signal using the transmission code and broadcasts the encoded beacon during a beacon transmission assignment indicated by the beacon schedule information, e.g., BBS cycle.

As shown, the charger 101 receives the beacon from the power receiver client 103 and decodes the encoded beacon signal using the transmission code provided to the client 103 to ensure that the client 103 is an authorized or selected client. The charger 101 also detects the phase (or direction) at which the beacon signal is received and, once the charger determines that the client is authorized, delivers wireless power and/or data to the power receiver client 103 based the phase (or direction) of the received beacon. In some embodiments, the charger 101 can determine the complex conjugate of the phase and use the complex conjugate to deliver and/or otherwise direct wireless power to the power receiver client 103 in the same direction (or phase) in which the beacon signal was received from the power receiver client 103.

In some embodiments, the charger 101 includes many antennas; one or more of which are used to deliver power to the power receiver client 103. The charger 101 can detect phases at which the beacon signals are received at each antenna. The large number of antennas may result in different coded beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As discussed herein, wireless power can be delivered in power cycles defined by power schedule information. A more detailed example of the signaling required to commence wireless power delivery is described now with reference to FIG. 3.

Figure 3:
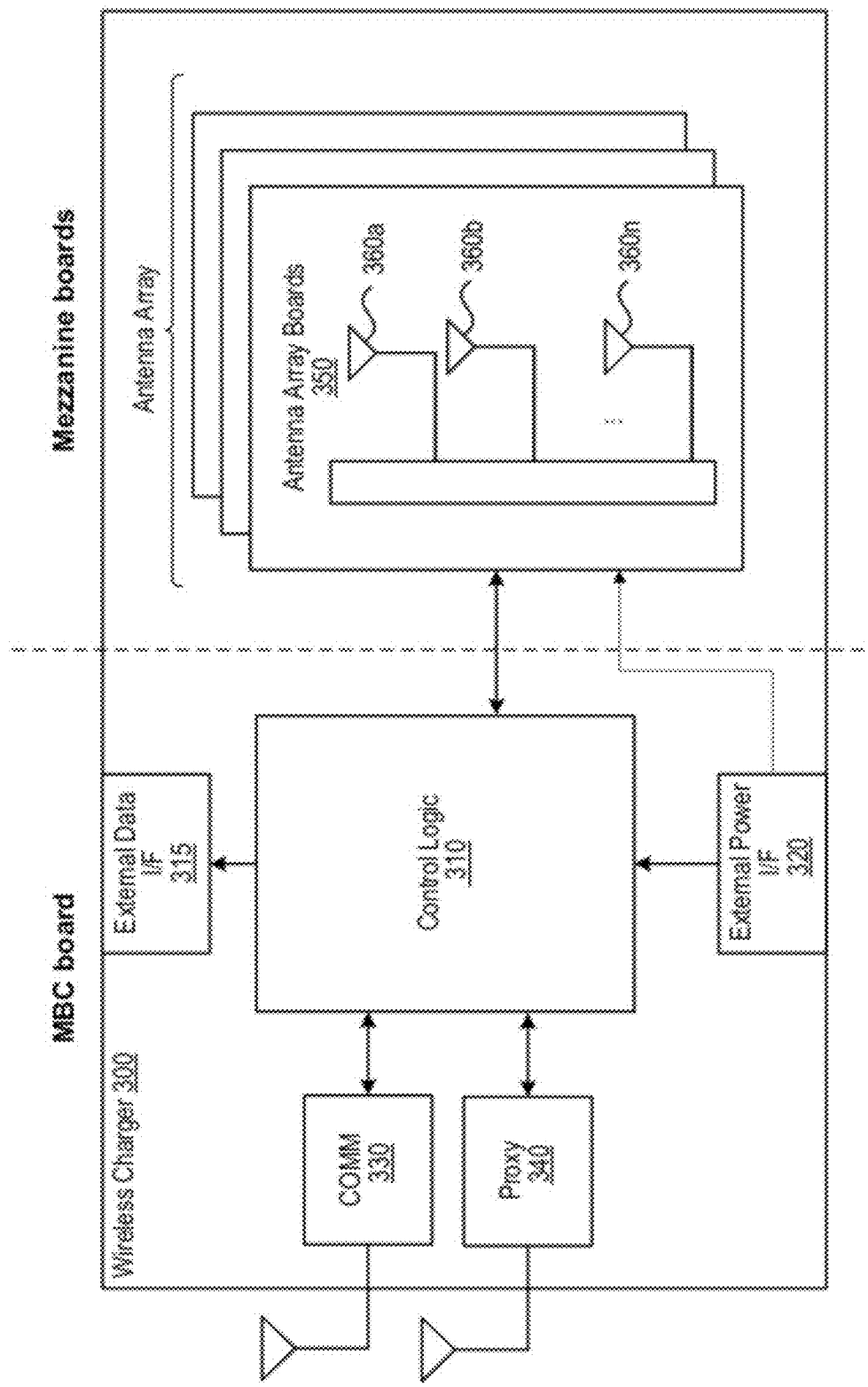
FIG. 3 depicts a block diagram illustrating example components of a wireless power transmitter (charger or wireless power delivery system) in accordance with some embodiments.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330, and proxy 340. The mezzanine (or antenna array boards 350) each include multiple antennas 360a-360n. Some or all of the components can be omitted in some embodiments. Additional components are also possible.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, ZigBee, etc. Likewise, the proxy 340 can communicate with clients via data communications as discussed herein. The data communications can be Bluetooth, Wi-Fi, ZigBee, etc.

In some embodiments, the control logic 310 can also facilitate and/or otherwise enable data aggregation for Internet of Things (IoT) devices. In some embodiments, wireless power clients can access, track and/or otherwise obtain IoT information about the device in which the wireless power receiver is embedded and provide that IoT information to the wireless charger 300 over a data connection. This IoT information can be provided to via an external data interface 315 to a central or cloud-based system (not shown) where the data can be aggregated, processed, etc. For example, the central system can process the data to identify various trends across geographies, chargers, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless charger acts as a Gateway or Enabler for the IoTs. By way of example and not limitation, the IoT information can include capabilities of the device in which the wireless power receiver is embedded, usage information of the device, power levels of the device, information obtained by the device or the wireless power receiver itself, e.g., via sensors, etc.

The external power interface 320 is configured to receive external power and provide the power to various components. In some embodiments, the external power interface 320 may be configured to receive a standard external 24 Volt power supply. Alternative configurations are also possible.

An example of a system power cycle is now described. In this example, the master bus controller (MBC), which controls the charger array, first receives power from a power source and is activated. The MBC then activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. A graphical signaling representation of an example BBS and PS is shown and discussed in greater detail with reference to FIG. 2. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise, the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 4:
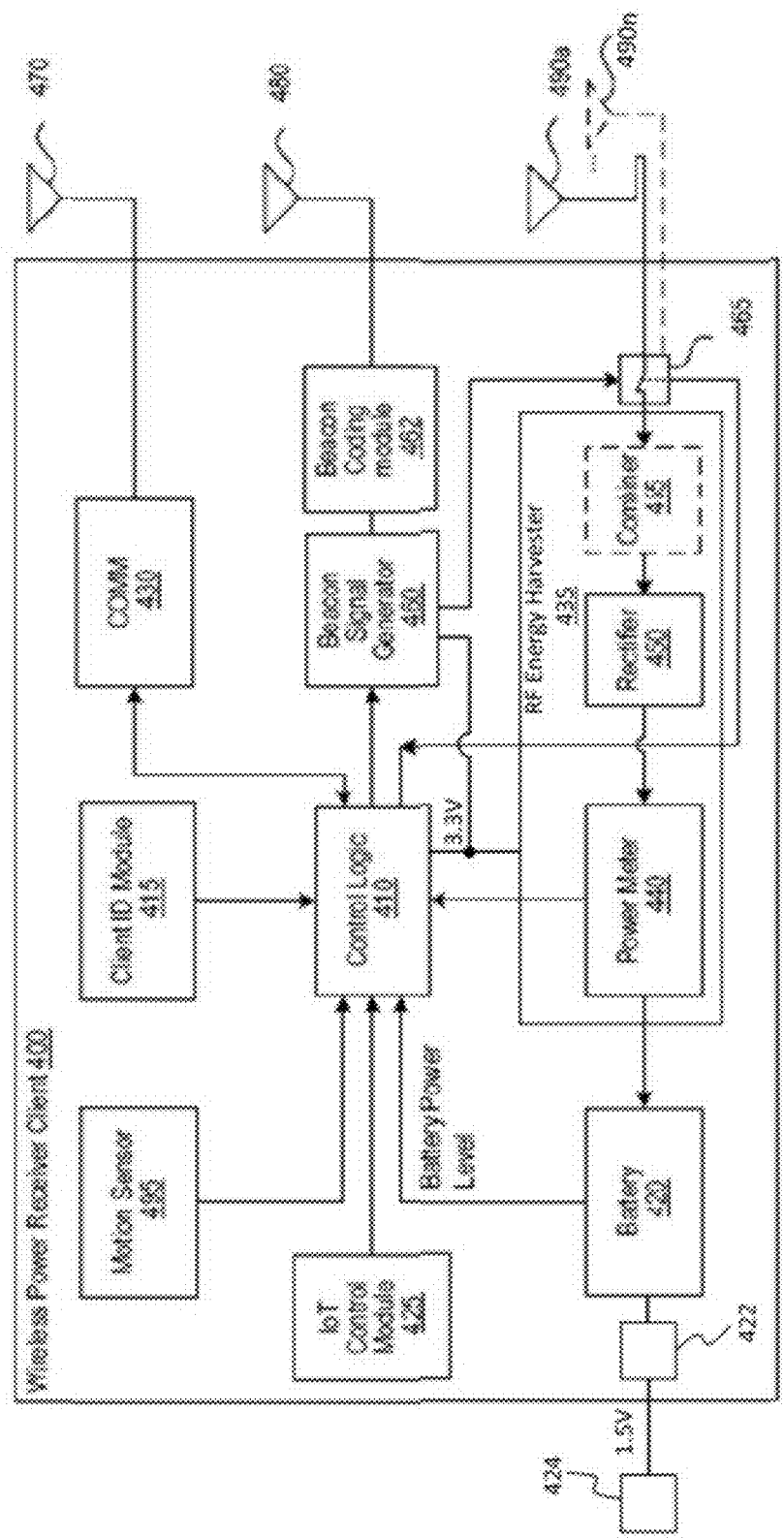
FIG. 4 depicts a block diagram illustrating example components of a wireless power receiver (client) in accordance with some embodiments.

FIG. 4 is a block diagram illustrating example components of a wireless power receiver (client), in accordance with some embodiments. As illustrated in the example of FIG. 4, the receiver 400 includes control logic 410, battery 420, an IoT control module 425, communication block 430 and associated antenna 470, RF energy harvester 435, beacon signal generator 460, beacon coding unit 462 and an associated antenna 480, and switch 465 connecting the rectifier 450 or the beacon signal generator 460 to one or more associated antennas 490a-n. In the embodiment illustrated in FIG. 4, the RF energy harvester 435 includes power meter 440, rectifier 450, and combiner 455. Some or all of the components can be omitted in some embodiments. For example, in some embodiments, the wireless power receiver client 400 does not include its own antennas but instead utilizes and/or otherwise shares one or more antennas (e.g., Wi-Fi antenna) of the wireless device in which the wireless power receiver is embedded. Additional components and antenna configurations are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. The power meter 440 measures the received power signal strength and provides the control logic 410 with this measurement. The power meter 440 further provides control logic 410 and beacon signal generator 460 with a regulated direct current (DC) power supply (e.g., 3.3V). Additionally, or instead, power meter 440 and beacon signal generator 460 may receive the appropriate regulated power supply from battery 420.

The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown for as charged by and providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna. Receiver 400 further includes a regulator 422 connected to battery 420 for generating a constant or near constant voltage level (e.g., 1.5V) to power any electronic devices 424 connected to, or integrated into, receiver 400.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver is embedded, usage information of the device in which the wireless power receiver is embedded, power levels of the battery or batteries of the device in which the wireless power receiver is embedded, and/or information obtained or inferred by the device in which the wireless power receiver is embedded or the wireless power receiver itself, e.g., via sensors, etc.

In some embodiments, a client identifier (ID) module 415 stores a client ID that can uniquely identify the power receiver client in a wireless power delivery environment. For example, the ID can be transmitted to one or more chargers when communication is established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

II. Wirelessly Chargeable Battery Apparatuses

Figure 5A:
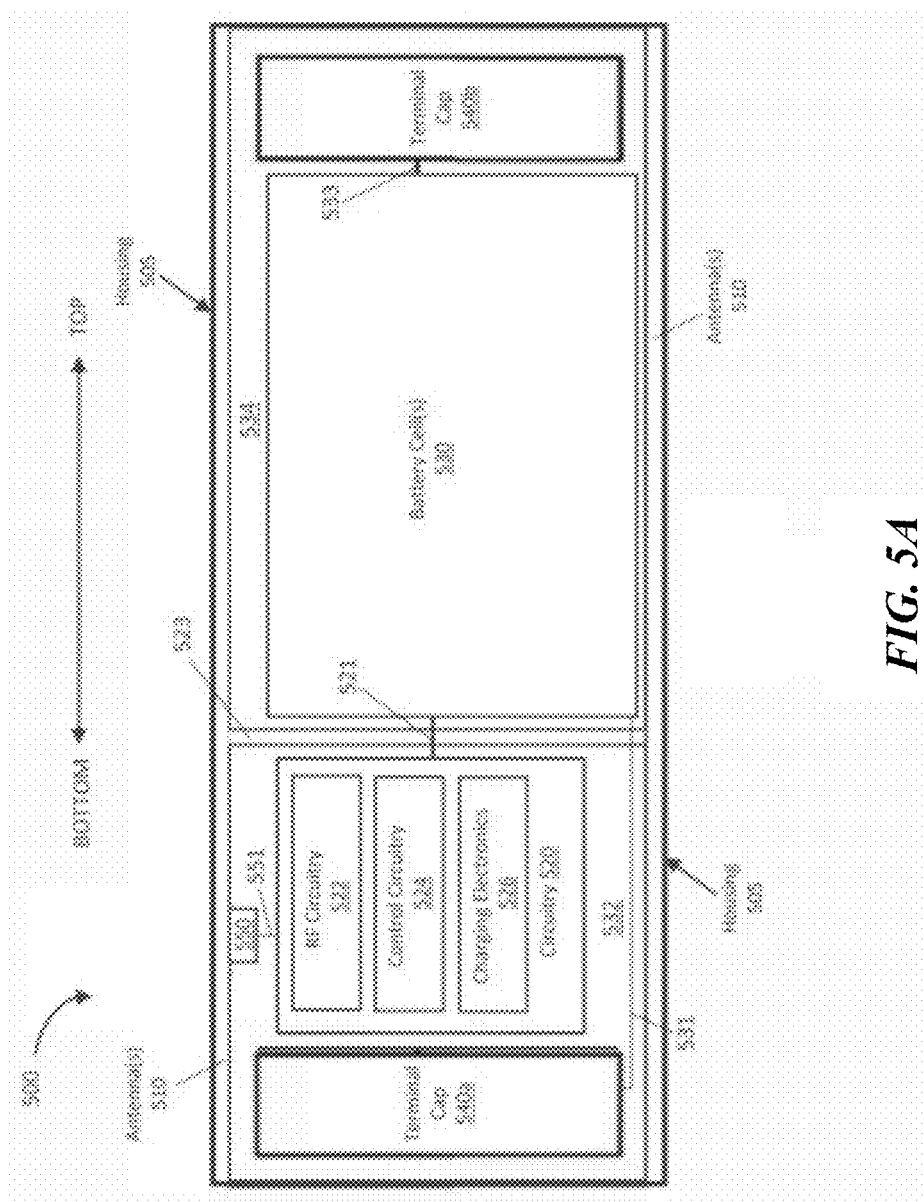
FIGS. 5A and 5B depict block diagrams illustrating example components of a wirelessly chargeable battery apparatus 500, according to some embodiments.
Figure 5B:
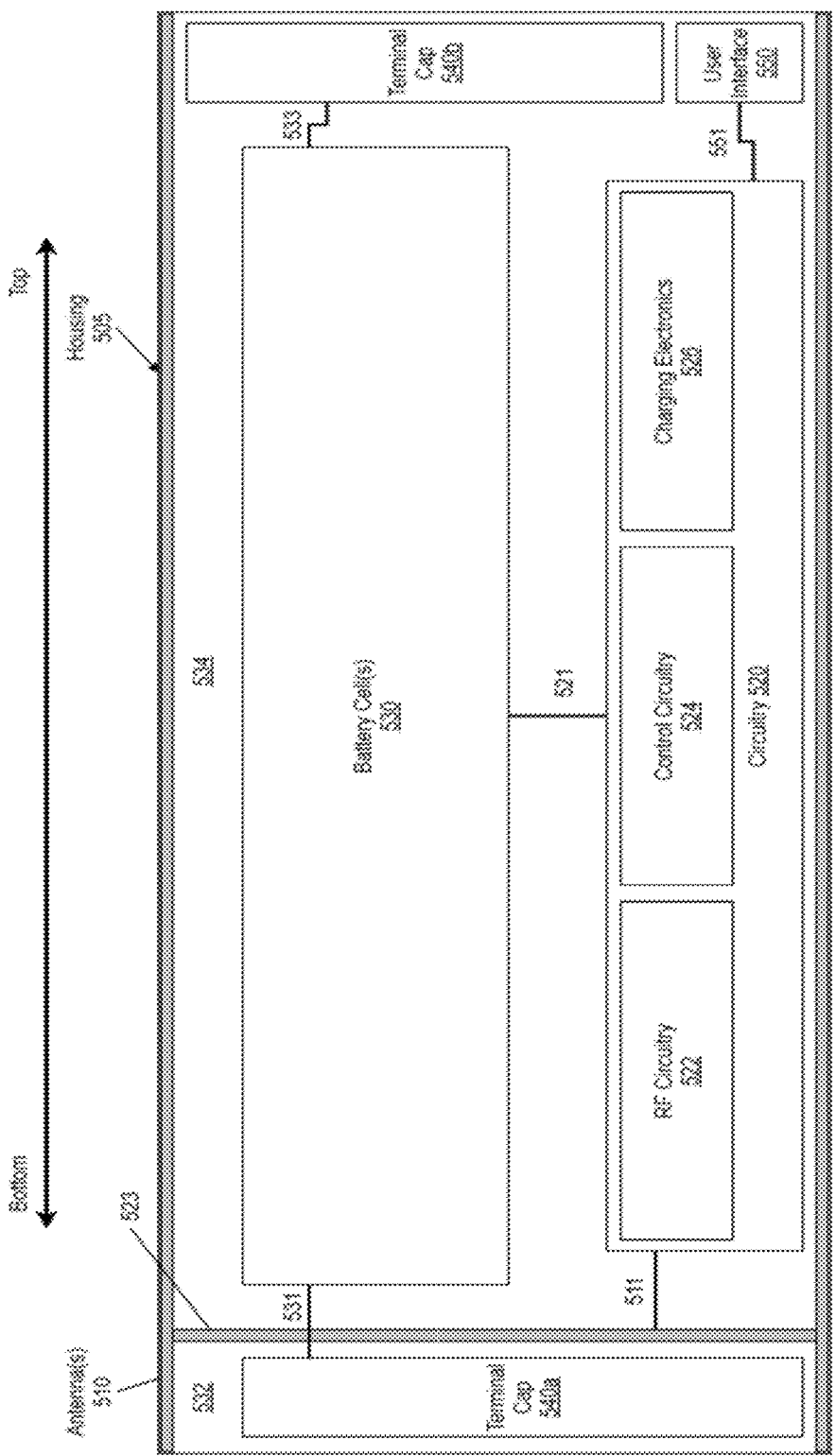

FIGS. 5A and 5B depict a block diagram illustrating example components of a wirelessly chargeable battery apparatus 500, according to some embodiments.

As shown in the example of FIGS. 5A and 5B, the wirelessly chargeable battery apparatus 500 includes a housing 505, one or more antennas 510, circuitry 520, one or more battery cells (or battery modules) 530, a user interface 550, and terminals caps 540*a* and 540*b*. An interior volume of housing 505 is divided by a separator piece (e.g., base 523) into a first (e.g., bottom) cavity 532 and a second (e.g., top) cavity 534. Battery cell(s) 530 are positioned inside the top cavity 534 and are connected to terminal caps 540*a* and 540*b* via connections 531 and 533, respectively, at least one of which may pass through base 523. The circuitry 520 is positioned inside the bottom cavity 532 and includes RF circuitry 522, control circuitry 524, and charging electronics 526. In the example shown in FIG. 5B, both battery cell(s) 530 and circuitry 520 are disposed inside of cavity 534, with cap 540*a* occupying cavity 532. As shown in the example of FIGS. 5A and 5B, the one or more antennas 510 are connected to the circuitry 520 via a connection 511 and the circuitry 520 is connected to battery cell(s) 530 via a connection 521, which may pass through base 523. Such connections may include custom elastomeric connections. Antenna(s) 510 may be formed integrally with, or otherwise attached to, housing 505 (e.g., on at least a portion of an interior housing 505 surface). In some embodiments, the whole housing 505 including the bottom 532 and top 534 cavities, and optionally the two terminal caps 540*a* and 540*b*, function as antenna(s) 510. As shown and described in greater detail below with reference to FIGS. 6A-6F, one or more antenna directors (not shown in FIGS. 5A and 5B) may be attached to an exterior surface of housing 505 to provide additional functionality to antenna(s) 510. Circuitry 520 is also connected to user interface 550 via a connection 551. The connections 511, 521, 531, 533, and 551 may be traces on a PCB, physical wires, or any other mechanism.

The housing 505 is configured in dimensions that conform to standardized battery dimensions. Accordingly, the wirelessly chargeable battery apparatus 500 is retrofittable into existing portable electronic devices without redesign of those electronic devices. As discussed herein, the portable electronic device can be any portable or mobile electronic device that is powered by rechargeable or non-rechargeable batteries, e.g., game controllers, remote controls, alarm systems, etc. The portable electronic devices can also be devices with less standardized rechargeable batteries such as, for example, mobile phones, tablet computers, etc. Furthermore, the wirelessly chargeable battery apparatus can include some or all of the components of a wireless power receiver client 400, the components of which are discussed in greater detail above.

As discussed above, the housing 505 is configured in dimensions that conform to standardized battery dimensions. The example of FIGS. 5A and 5B with terminal caps 540*a* and 540*b* is not shown to scale. The housing 505 can be configured in cylindrical or non-cylindrical cell battery form factors, camera battery form factors, button cell battery form factors, etc. For example, the standard form factor can be, among other form factors, AA, AAA, C, D, 4.5-volt, 9-volt, Lantern (spring) battery form factors. Furthermore, in some embodiments, the standard form factor can be a form factor that is configured to power mobile devices, including, but not limited to, mobile phone batteries, tablet computer batteries, etc. Example wirelessly chargeable battery apparatuses are shown and discussed in cylindrical form factor. However, as discussed herein, the wirelessly chargeable battery apparatuses are not limited to cylindrical form factors.

The one or more antennas 510 are configured to receive a wireless power signal from a wireless charging system, e.g., a wireless charger. As discussed herein, the wireless power signals can include AC power.

As shown in the example of FIGS. 5A and 5B the circuitry 520 includes RF circuitry 522, control circuitry 524 and charging electronics 526. The one or more antennas 510 can be located within the housing 505 on one or more PCBs, e.g., flexible PCBs, embedded on or within the interior surface of the housing 505, and/or attached to, or embedded on or within, the exterior surface of the housing 505 including combinations and/or variations thereof. In these embodiment, one or more of the connection(s) between the antennas 510 and/or PCB(s) and/or other components of apparatus 500 may be embodied in custom elastomeric connection(s).

Among other functions, the RF circuitry 522 and the control circuitry 524 can perform the various control functions of a wireless power receiver as discussed in greater detail above with reference to FIG. 4. For example, the RF circuitry 522 and/or other components of the circuitry 520 can process the wireless power received via the one or more antennas 510 and convert received wireless RF power to DC power. In some embodiments, the RF power is AC power. The charging electronics 526 can, among other functions, detect status information of the one or more battery cells 530 and/or one or more internal battery of the portable electronic device to which the housing is attached and control the charging of the one or more battery cells 530 based on this information. As discussed herein the one or more battery cells 530 can store the DC power. In some embodiments, other storage technology can be used in lieu of or in addition to the one or more battery cells 530. Alternatively, in some embodiments, the wirelessly chargeable battery apparatus may not include a battery cell 530 but instead directly charge one or more batteries of a portable electronic device to which it is removably attached.

The wirelessly chargeable battery apparatus 500 includes terminal caps 540a and 540b over which power can be exchanged between the battery 530 and/or circuitry 520 and the portable electronic device when the wirelessly chargeable battery apparatus 500 is inserted into a battery recess or other storage compartment of the portable electronic device.

The user interface 550 can include an interface configured to provide information to a user of a portable electronic device and/or an interface configured to allow the user of the portable electronic device to provide information to the wirelessly chargeable battery apparatus 500. In some embodiments, light emitting diodes (LEDs) can be used to indicate various statuses of the wirelessly chargeable battery apparatus 500. For example, an LED can display a particular color to indicate each battery charging state (e.g., low, med, or high) for battery cell(s) 530. The user interface 550 can also include one or more user buttons or switches. For example, an ON/OFF switch can be provided on the wirelessly chargeable battery apparatus 500 to control whether or not the apparatus should process wireless power. In other examples, a button can be provided that, once pressed, activates charging of the one or more batteries of a portable electronic device using the energy stored in the one or more battery cells 530 of the wirelessly chargeable battery apparatus 500. Other user interface embodiments are also possible. The user interface 550 can also include sensors (not shown). For example, a magnetic hall effect sensor can be provided on the control circuitry 524 without requiring an opening in the housing 505. This could allow the user to control the behavior of the wirelessly chargeable battery apparatus 500. The user interface 550 can also include the necessary connections required to allow the user to connect and make software or firmware modifications to the control circuitry 524, for instance. The connections could take the form of a standard programming interface, such as but not limited to JTAG, cJTAG, or SWD. The location for these connections could be a part of the housing 505, terminal cap 540a, and/or terminal cap 540b. Although not illustrated, sensors and connections may likewise be included in the embodiment shown in FIG. 5B.

As will be appreciated, for any given standardized form factor for wirelessly chargeable battery apparatus 500, minimizing the space and volume of the interior of housing 505 used for components other than the battery cell(s) 530 is desirable so as to maximize the size of the battery cell(s) 530, and thereby maximize the energy storage capacity of the wirelessly chargeable batteries disclosed herein.

Figures 7A, 7B:
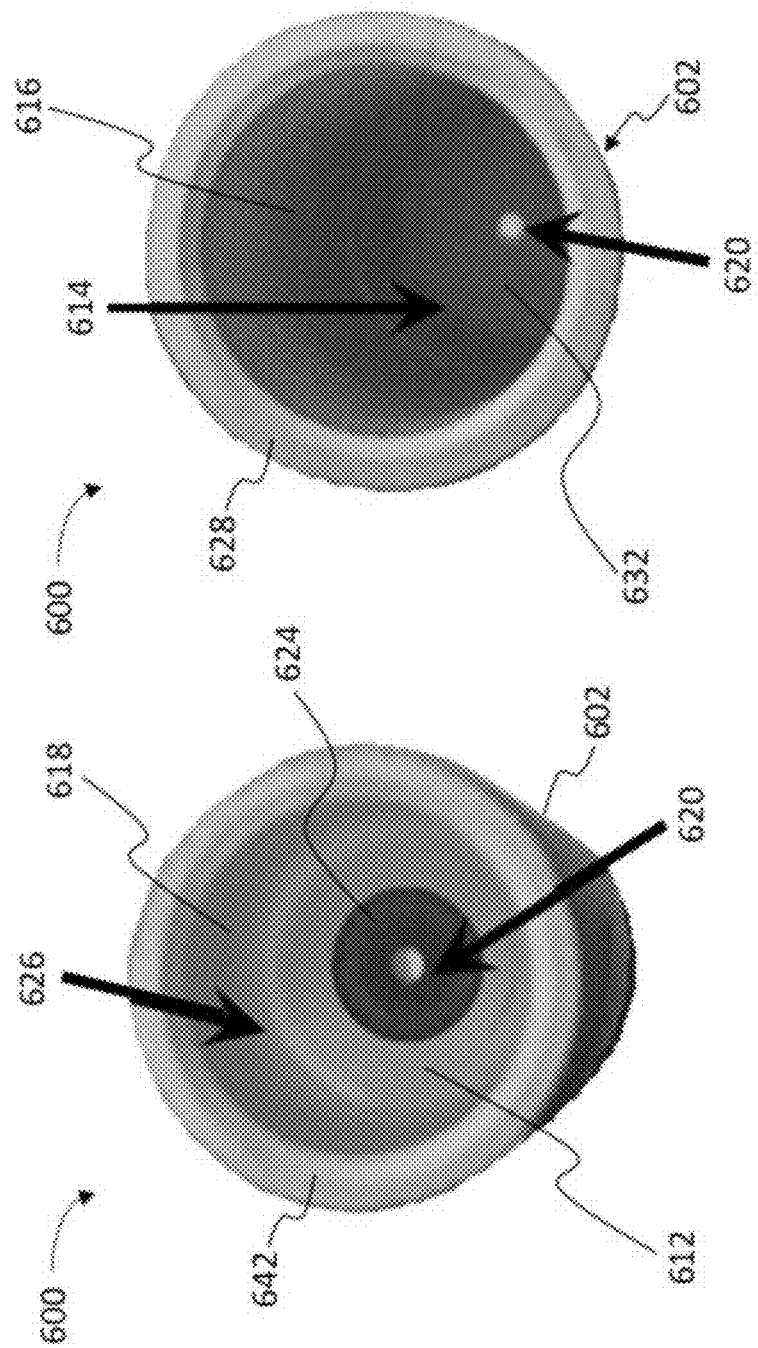
FIGS. 7A and 7B depict perspective views of opposite ends of the wirelessly chargeable battery apparatus shown in FIGS. 6A-6F, according to some embodiments.
Figure 8:
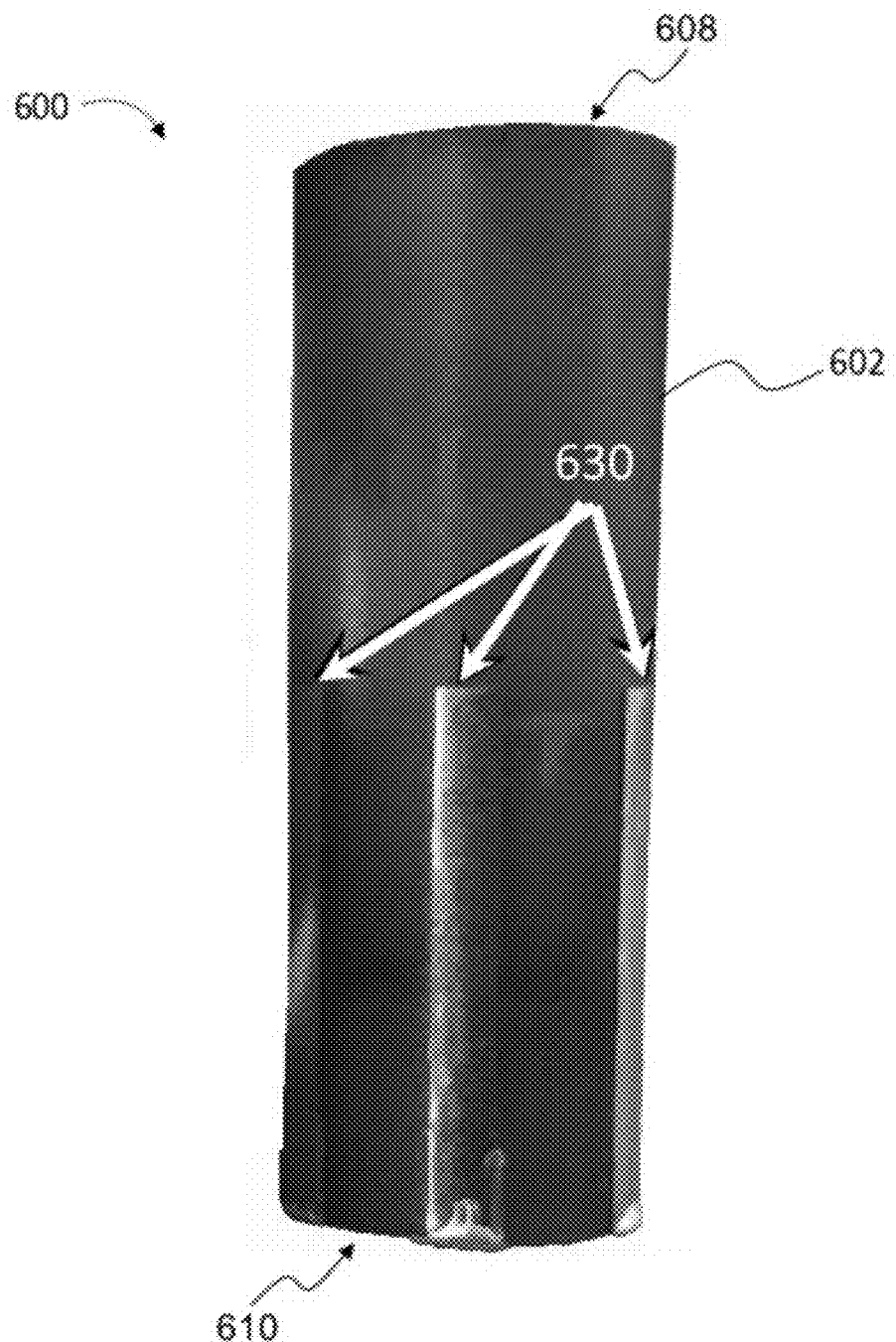
FIG. 8 depicts a side view of the fabricated wirelessly chargeable battery apparatus shown in FIGS. 6A-6F, 7A and 7B, according to some embodiments.

FIGS. 6A-6F depict perspective and sectional views of a wirelessly chargeable battery apparatus packaged in a cylindrical form factor, according to some embodiments. FIGS. 7A and 7B depict perspective views of opposite ends of the wirelessly chargeable battery apparatus shown in FIGS. 6A-6D, according to some embodiments. FIG. 8 depicts a side view of the fabricated wirelessly chargeable battery apparatus shown in FIGS. 6A-6D, 7A and 7B, according to some embodiments. More specifically, FIGS. 6A-6F, 7A, 7B, and 8 illustrate various views of an example wirelessly chargeable battery apparatus 600 packaged in a housing 605 configured in dimensions that conform to a standard AA type battery. The wirelessly chargeable battery apparatus 600 may be wirelessly chargeable battery apparatus 500 of FIGS. 5A and 5B, although alternative configurations are possible. For clarify of presentation in FIGS. 6B, 7A, and 7B, terminal caps (e.g., 540a and 540b of FIGS. 5A and 5B) are not illustrated at opposite ends of apparatus 600. However, in a final product form of the disclosed wirelessly chargeable battery apparatuses, such terminal caps are attached to the opposite ends and connected to battery cell(s) positioned inside the housing.

Wirelessly chargeable battery apparatus 600 includes cylindrical housing 602 with base 622. A first surface 632 of base 622 defines a circle facing the open axial end of housing 602. Battery apparatus 600 includes annular end piece 604 coupled to second axial end of housing 602 at base 622. With the annular end piece 604 so attached, a second surface 612 of base 622 defining a circle faces the open axial end of end piece 604 positioned in apparatus 600 at the end opposite the open axial end of housing 602. A hole 620 is bored through the base 622 to provide a through-hole via-like passage between an interior space of housing 602 and an interior space of annual end piece 604.

Housing 602, base 622, and annular end piece 604 are formed from an insulative or dielectric material such as a plastic (e.g., Ultem 1010). In some embodiments, housing 602, base 622, and annular end piece 604 are molded or otherwise fabricated as a one-piece construction, possibly also including hole 620. An interior surface 616 of housing 602, axially opposed surfaces (632 and 612) of base 622, hole 620, and an interior surface 618 of annular end piece 604 are plated or otherwise coated or covered with a conductor (e.g., copper) using process such as electroplating. In some embodiments, opposed axially exterior surfaces of housing (e.g., surface 628) and annular end piece 604 (e.g., surface 642) are also plated or otherwise coated or covered with the conductor. In the examples illustrated in FIGS. 6A-6F, 7A, 7B, and 8, copper is plated onto the aforementioned surfaces as a continuous material. In some embodiments, a ring trench structure 624 is formed in a portion of base 622 surface 612, with a portion of the copper plating removed therefrom.

When the open axial end of housing 602 is closed by a first cap 608 attached to axially exterior surface 628 of housing 602, an interior cavity 614 is defined by housing 602, base 622 surface 632, and first cap 608. In an example, first cap 608 defines the top of wirelessly chargeable battery apparatus 600 and includes a terminal cap, as shown, for example, in FIGS. 5A and 5B. In some embodiments, first cap 608 is formed of a conductive tape (e.g., copper) and a top (e.g., positive) terminal cap is attached to an axially exterior surface of first cap 608. Similarly, when the open axial end of annular end piece 604 is closed by a second cap 610 attached to axially exterior surface 628 of end piece 604, an interior cavity 626 is defined by end piece 604, base 622 surface 612, and second cap 610. In an example, second cap 610 defines the bottom of wirelessly chargeable battery apparatus 600 and includes a terminal cap, as shown, for example, in FIGS. 5A and 5B. In some embodiments, second cap 610 is formed of a conductive tape (e.g., copper) and a bottom (e.g., negative) terminal cap is attached to an axially exterior surface of second cap 610. For clarify of presentation in FIGS. 6A-6D, 7A, and 7B, battery cell(s) (e.g., numbered 530 in FIGS. 5A and 5B) are not illustrated inside cavity 614 of apparatus 600. However, in a final product form of the disclosed wirelessly chargeable battery apparatuses, such battery cells or modules are positioned in cavity 614 and enclosed therein by top terminal cap 608. Likewise, in FIGS. 6A-6D, 7A, and 7B, circuitry (e.g., numbered 520 in FIGS. 5A and 5B) is not illustrated inside cavity 626 of apparatus 600. However, in a final product form of any of the disclosed wirelessly chargeable battery apparatuses, battery cells and circuitry (e.g., as a PCB) are positioned in cavities 614 and 626 and are respectively enclosed therein by top 608 and bottom 610 terminal caps.

Inclusion of ring trench structure 624 or a similar configuration provides electronic isolation between cavities 614 and 626. The conductor coating interior surfaces 616 and 632, and possibly also surface 628, functions as at least a portion the RF receiving antenna, as well as at least a portion of the beacon signal transmitting antenna, in battery apparatus 600. These coated surfaces further provide isolation of cavity 614 and battery cell(s) contained therein from external RF radiation. In some embodiments, the aforementioned surfaces 616 and 632, and possibly 628, serve as one pole of the RF antenna in apparatus 600. The conductor coating interior surfaces 618 and 612, and possibly also surface 642, may serve as a second pole of the RF antenna in apparatus 600. Metallic coatings on these surfaces also provide isolation of cavity 626 and digital and/or analog electronic components contained therein from external RF radiation. Insulated wiring fed through hole 620 provides electric power flow and/or data communication between components contained in cavities 614 and 626.

Wirelessly chargeable battery apparatus 600 includes a plurality of antenna director planes 630 (referred to herein more succinctly as directors 600). The apparatus 600 shown in FIGS. 6A-6D, 7A, 7B and 8 includes six directors 630 formed as die cut, rectangularly shaped copper plates. Directors 630 are coupled, or otherwise attached to, the radially exterior surfaces of housing 602 and annular end piece 604. The directors 630 are spaced equally from one another in some embodiments. A first end of each director 630 is coupled to a portion of end piece 604 proximate its open axial end at the bottom of apparatus 600. In some embodiments, director 630 first ends are electrically isolated by the material of construction of annular end piece 604 from the conductor coating of surface 618 and possibly also surface 642. In other embodiments, at least one of the director 630 first ends is electrically coupled to surfaces 618 and/or 642.

Each director 630 extends upward along the radially exterior surface of end piece 604 and housing 602 toward the top of the battery apparatus 600. In the illustrated embodiment, a length of each director 630 is less than an axial length of the battery apparatus 600 (e.g., half). In some embodiments, at least one director 630 of the plurality of directors 630 has a length that is different from a length of at least one other director 630. In the illustrated embodiment, a width of each director 630 is equal. In some embodiments, at least one director 630 of the plurality of directors 630 has a width that is different from a width of at least one other director 630. In an example, apparatus 600 includes an even number of directors 630. In another embodiment, apparatus include an odd number of directors 630.

In another embodiment (not shown), a first end of at least one of the plurality of directors 630 is not positioned at or very near the axial end of annular end piece 604. In such examples, the director 630 is positioned between the opposed axial ends of battery apparatus. Director(s) 630 according these other embodiments may be rectangularly shaped, square shaped, or take any other geometric shape other than these two shapes. For any of the disclosed director 630 configurations, housing 602, end piece 604, directors 630, and at least a portion of caps 608 and/or 610 may be covered with a protective film to provide structural integrity and protection and to prevent damage to external portions of apparatus 600, including the directors 630. For instance, in some embodiments, one or more director or reflector planes 825 can be included with a sleeve or casing that fits over a wirelessly chargeable battery apparatus 600. The sleeve or casing can include the one or more director or reflector planes 825 on the interior or the exterior of the sleeve or casing including combinations and/or variations thereof.

In operation, directors 630 can direct and/or otherwise reflect or modify the antenna transmission and/or reception radiation pattern to increase antenna efficiency for the beacon signal and the signal received for RF power harvesting. As discussed herein, the antenna efficiency includes both the ability to transmit a stronger beacon signal to a wireless power transmission system as well as the ability to receive more power, e.g., stronger signals, from a wireless transmission system. Notably, as compared to known wirelessly chargeable battery devices and systems, the embodiments of the present disclosure enable efficient use of space and volume on or in the housing 602 to provide conductive patterns that are conformal and tunable to effectively operate at 5.8 GHz without interference from electronic and battery cell components, and where antenna performance may be optimized by directors 630 resonating at beneficial frequencies. No externally connected electronics or other component parts are required such that standard battery form factors are not upset by the disclosed wirelessly chargeable battery apparatuses.

Cavity 614 provides a space and volume to position one or more battery cells providing the energy storage for the wirelessly rechargeable battery apparatus 600, as shown and described above with reference to battery cell(s) 530 of FIGS. 5A and 5B. Cavity 626 provides a space and volume to position analog and/or digital electronic components such as those shown and described above with reference to FIGS. 4, 5A and 5B. In this way, the enclosure described above with reference to FIGS. 6A-6D, 7A, 7B and 8 makes use of available interior spaces and surfaces, along with available exterior surfaces, to provide additional available volume for energy storage as compared to known wirelessly rechargeable batteries. According to the disclosed devices and systems, the improvement in battery storage capacity is achieved while not altering the dimensions and form factors of standardized battery sizes like the AA size, and without having to make use of external components such as electronics and receiving antennas. In some embodiments, the improvement in battery charge capacity for equivalent battery cell types and materials, and for the same standard battery sizes and/or form factors, is at least twice that of known wirelessly chargeable batteries.

Notably, the disclosed wirelessly chargeable battery apparatus 600 utilizes a radiator that is fully integrated into the enclosure in a highly space and volume efficient fashion. In some embodiments, the design of this radiator is inspired by a dipole antenna. The antenna illustrated in FIGS. 6A-7B is thus referred to as a dipole-inspired antenna. In some embodiments, the antenna(s) of any of the disclosed wirelessly chargeable battery apparatuses may be monopole-inspired antenna(s). In other embodiments the antenna(s) or radiator(s) of the any of the disclosed wirelessly chargeable battery apparatuses may be at least partially embodied in at least one of the following forms: a two conformal patch antenna on the outside of the housing 602, where for instance, instead of directors 630, two circularly polarized patch antennas are printed on, or otherwise attached to or positioned on, housing 602. In such cases, cavity 614 may function as the patch antennas' ground plane. The disclosed antenna design allows for receipt of circularly polarized incident RF radiation from any direction to charge the battery cells in the battery apparatus 600. The disclosed design thus provides a major technical improvement over known wirelessly chargeable batteries that must rely on directional RF radiation, tuning and additional electrical and/or mechanical components for optimizing RF receipt in optimal directions, and which utilize linearly polarized antennas for charging battery cells.

Figure 6A:
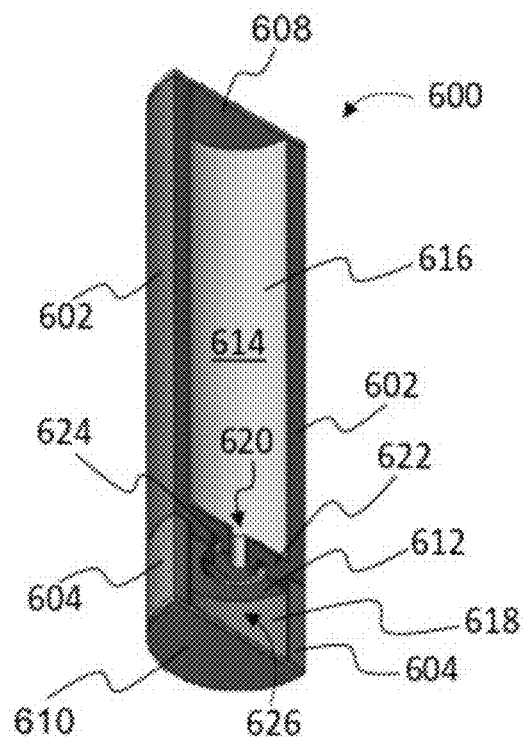
FIGS. 6A-6F depict perspective and sectional views of a wirelessly chargeable battery apparatus packaged in a cylindrical form factor, according to some embodiments.
Figure 6B:
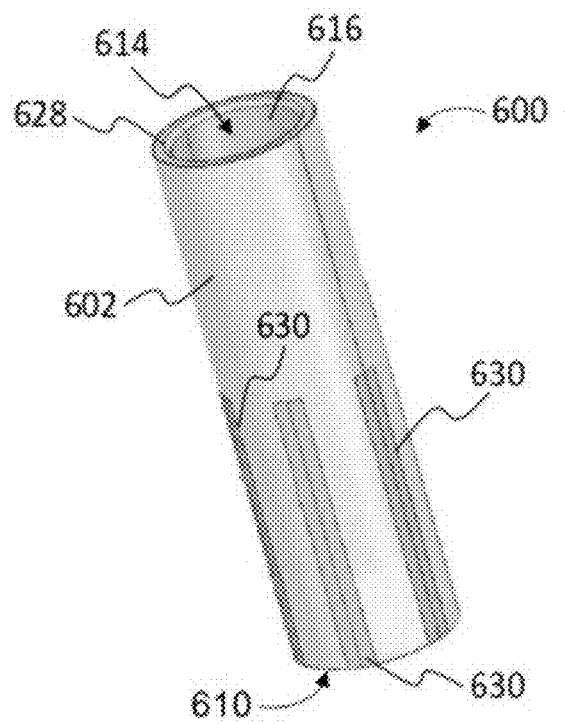
Figure 6C:
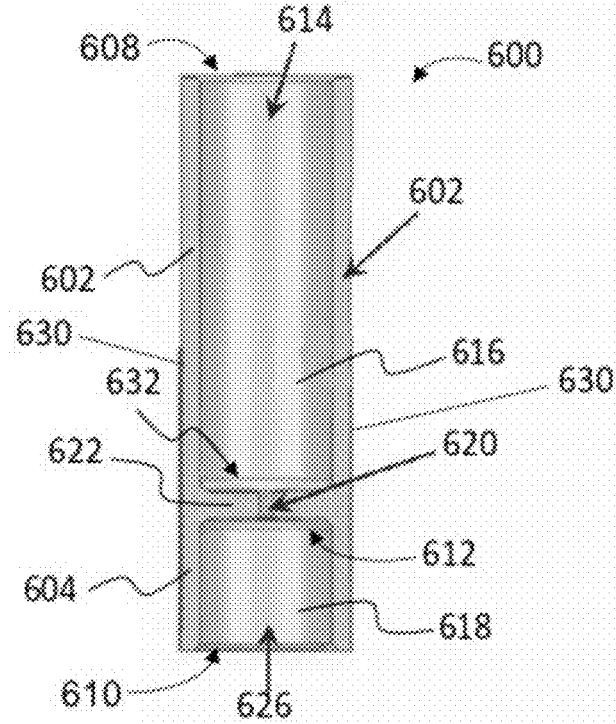
Figure 6D:
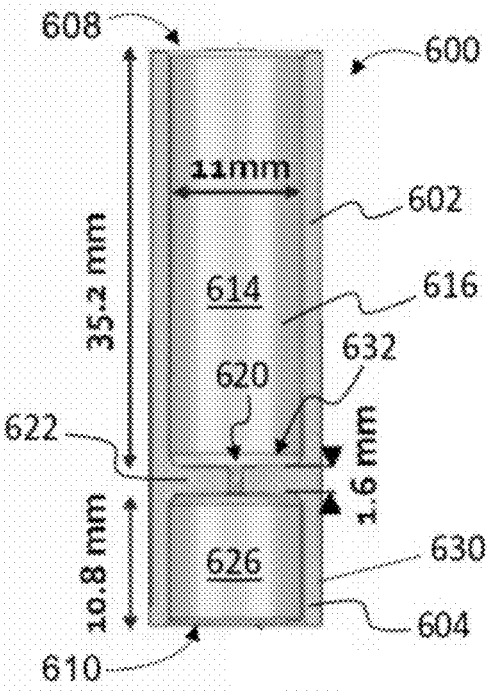
Figure 6F:
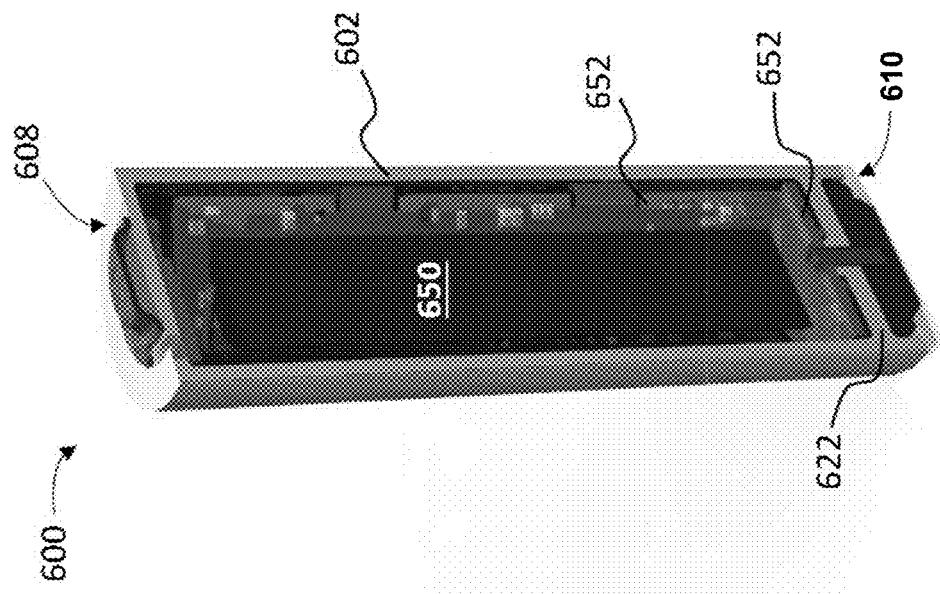
Figure 6E:
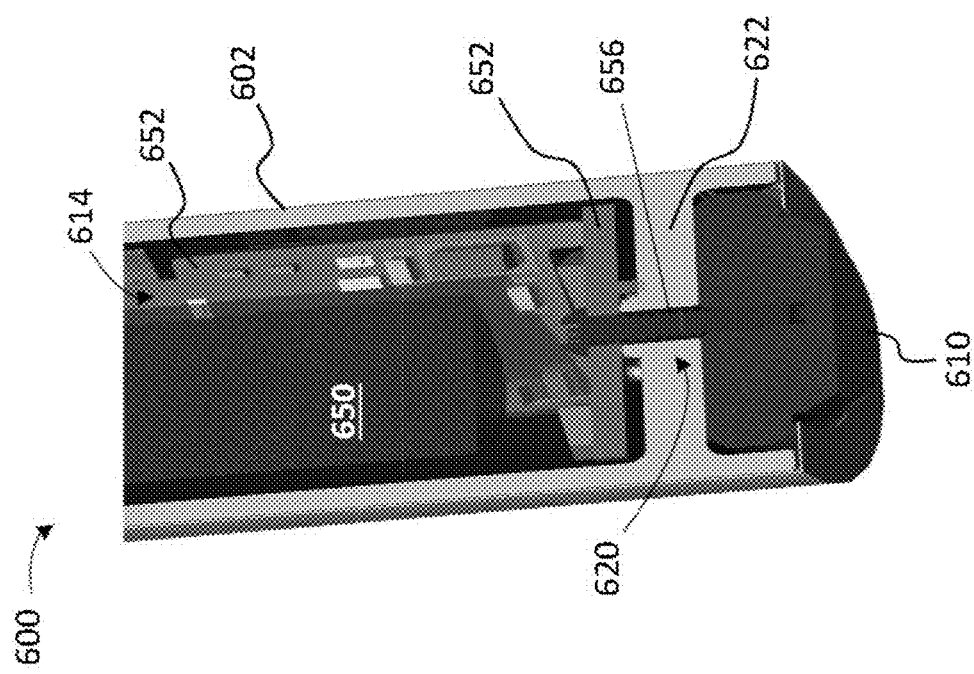

Referring to FIGS. 6E and 6F, in some embodiments, cavity 614 may be occupied by battery cell(s) 650 and circuitry 652. In an example, battery cell(s) 650 can take up between a quarter to three-fourths of the volume of cavity 614, with components of circuitry 652 occupying at least a portion of the remaining volume of cavity 614. In the example illustrated in FIGS. 6E and 6F, circuitry 652 is embodied in a two-piece PCB having a first piece disposed in cavity 614 adjacent to battery cell(s) 650, and a second piece positioned between battery cell(s) 650 and base 622. This arrangement can efficiently use the available space and volume of cavity 614 and may provide better protection of circuitry 652 components during use, storage or transportation. This arrange may also be especially suited for high capacity battery cell(s) 652, including those that are currently known and that may be developed in the future. The arrangement shown in FIGS. 6E and 6F can also free space and volume adjacent to the second surface 612 of base 622. In the illustrate example, second cap 610 may include flanges that are inserted into interior cavity 626 and be electrically coupled to circuitry 652 using connector 656. Connector 656 may include a conductor (e.g., wire) embedded or otherwise enclosed by an elastomeric material sized and shaped to securely pass through hole 620. With battery cell(s) 650 and circuitry 652 disposed inside cavity 614, the illustrated second cap 610 can provide a durable configuration able to withstand both rugged handling and occasional exposure to moisture during usage of apparatus 600.

Figure 9:
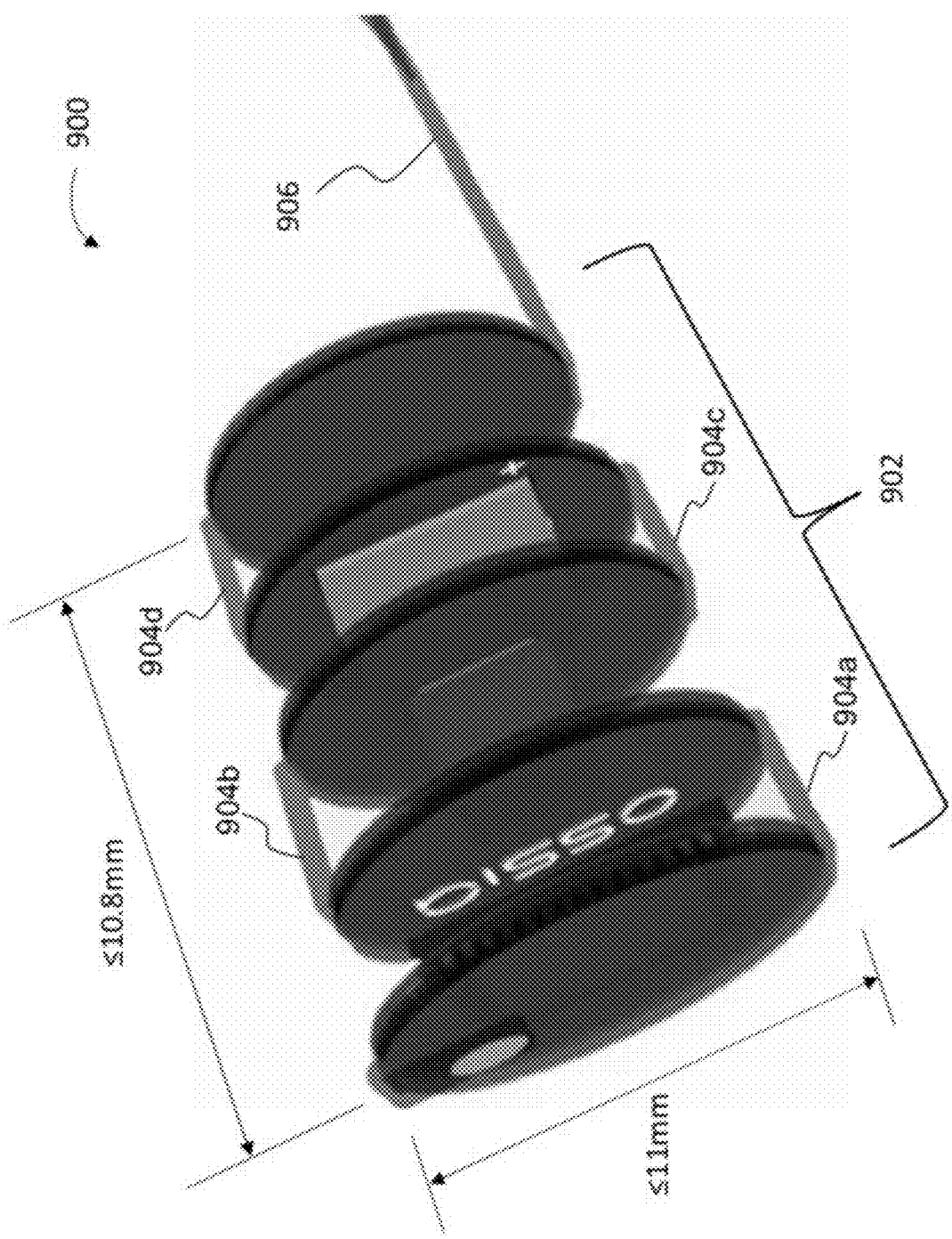
FIG. 9 depicts a perspective view of a printed circuit board (PCB) assembly for use in the wirelessly chargeable battery apparatus shown in FIGS. 6A-6D, 7A, 7B and 8, according to some embodiments.

FIG. 9 depicts a perspective view of a PCB assembly 900 for use in the wirelessly chargeable battery apparatus 600 shown in FIGS. 6A-6D, 7A, 7B and 8, according to some embodiments. PCB assembly 900 includes a stack of plurality of flex PCB pieces 902 that are appropriately shaped and dimensions to fit in cavity 626 of wirelessly chargeable battery apparatus 600. For the battery apparatus 600 of FIGS. 6A-6D, 7A, 7B and 8 for the AA battery form factor, for example, cavity 626 is 10.8 mm high in the axial direction and 11 mm wide in the radial direction. In tis case, the stack of PCB pieces 902 is ≤10.8 mm tall and ≤111 mm wide, as shown in FIG. 9.

The analog and/or digital electronic components shown and described above with reference to FIGS. 4, 5A and 5B, for example, are distributed amongst the two or more PCB pieces 902. Components necessary for the functioning and operation of the disclosed battery apparatus 600 positioned on adjacent PCB pieces 904 are electronically connected for power transfer and data communication by way of connectors 904. In the illustrated embodiment, PCB assembly 902 includes five PCB pieces 902. Components of a first and a second PCB piece 902 are connected by a first, flexible tape-type wire harness connector 904a. The components of the second PCB piece 902 and components of a third PCB piece 902 are connected by a second connector 904b similar to the first connector 904a. Likewise, components on the third and fourth PCB pieces 902, and components on the fourth and fifth PCB pieces 902, are connected by third 904c and fourth 904d connectors. Components of the fifth PCB piece 902, and also the entire PCB assembly 900, are connected to components (e.g., battery cell(s)) in cavity 614 by a wire connection 906 fed through the hole 620 and/or one or more other holes bored through, or inserted in, base 622.

III. Test Results

A prototype wireless chargeable battery apparatus including the aforementioned components of apparatus 600 was tested for charging by RF power conversion using a 5.8 GHz transmitter. Table 1, below, present the experimental results and interpretations of the results.

TABLE 1

| | | Antenna | |
|---|---|---|---|
| # | Item | Value | Comments |
| 1 | Antenna Bandwidth | 300 MHz | Means that within the +/−150 MHz around the center frequency (5.845 GHz), >90% of the power available at the port will be delivered to the antenna. |
| 2 | Max Gain | 3.5 dBi* | * At an elevation angle of −5 degrees |
| 3 | Radiation Pattern | Omni-directional | |

Figure 10A:
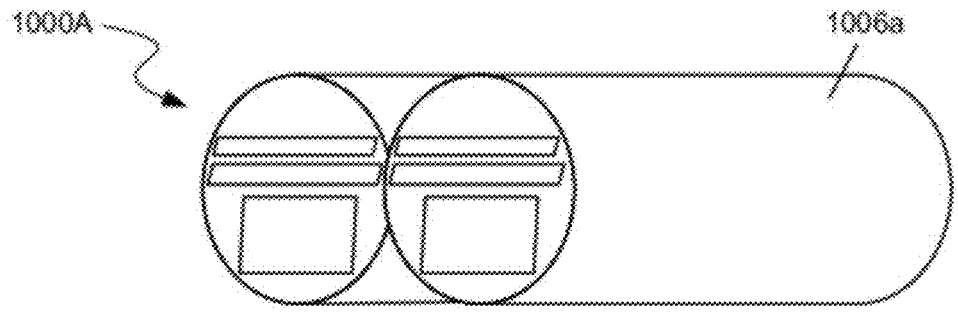
FIGS. 10A-10C depict a front perspective view and two cross sectional top views, respectively, of example multi-wirelessly chargeable battery apparatuses, according to some embodiments.
Figure 10B:
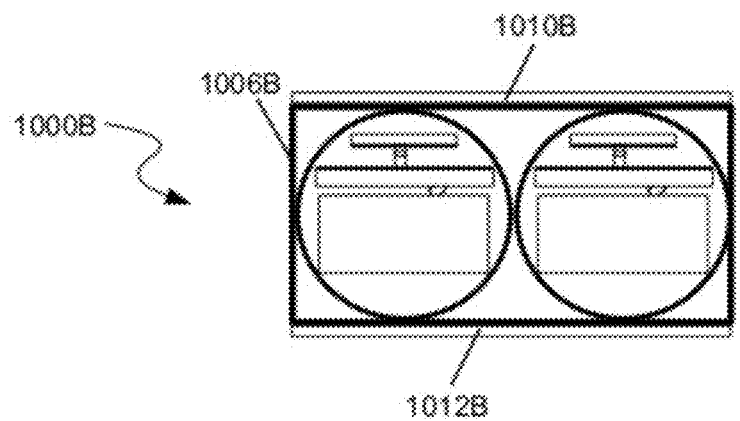
Figure 10C:
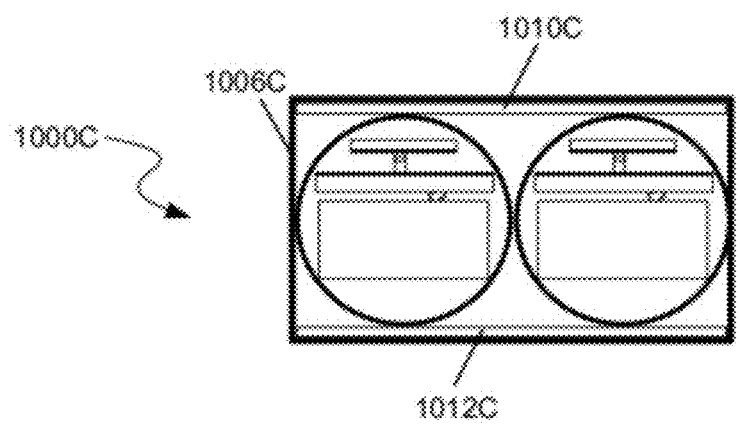

FIGS. 10A-10C depict a front perspective view and two cross sectional top views, respectively, of example multi-wirelessly chargeable battery apparatus 1000a-1000c, according to some embodiments. More specifically, as shown in the examples of FIGS. 10A-10C, the multi-wirelessly chargeable battery apparatuses 1000a-1000c each include two wirelessly chargeable battery apparatuses. The wirelessly chargeable battery apparatuses could be any the apparatuses discussed herein, although alternative configurations are possible.

The multi-wirelessly chargeable battery apparatuses 1000a-1000c include package covers 1006a-1006c, antennas, antenna/RF circuit boards, control circuit boards, and batteries. In the examples of FIGS. 10A-10C, the multi-wirelessly chargeable battery apparatuses 1000a-1000c include package covers that are configured in dimensions that conform to two standard AA type batteries. More specifically, package covers 1006b and 1006c are shown as rectangular packages while package 1006 is configured to closely mimic the dimensions of the multiple standardized batteries.

The antennas can be configured internally or externally. In some embodiments, the antennas are embedded and/or otherwise places on or within the package covers 1006a-1006c for increased surface area. For example, the example of FIG. 10B illustrates antennas 1010b and 1012c embedded and/or otherwise placed on the exterior of the package cover 1006b while the example of FIG. 10C illustrates antennas 1010b and 1012b embedded and/or otherwise placed on the exterior of the package cover 1006b while the example of FIG. 10C illustrates antennas 1010c and 1012c embedded and/or otherwise placed on the interior of the package cover 1006c. Alternative configurations are also possible. For example, in some embodiments antennas could be placed and/or otherwise embedded within the package cover. Combinations and/or variations of the discussed embodiments are also possible.

FIGS. 11A-11D depict various front perspective views and a cross sectional top view, respectively, of example multi-wirelessly chargeable battery apparatus packages 1100a-1100d, according to some embodiments. More specifically, the examples of FIGS. 11A-11D illustrate various example antenna configurations that are embedded and/or otherwise situated on or within a multi-wirelessly chargeable battery apparatus package cover.

As shown in the examples of FIGS. 11A-11D, the antenna configurations include a multi-bowtie configuration (FIG. 11A), a slot configuration (FIG. 11B), a dipole configuration (FIG. 11C), and a cube antenna structure configuration (FIG. 11D). Other configurations are also possible.

The cube antenna structure configuration of FIG. 11D includes one or more antennas that are wrapped around the multi-wireless power reception apparatus package. This type of configuration generally radiates in every direction and thus does not require that the package be inserted or otherwise placed in a device in a particular orientation. In some embodiments, each face of the cube antenna structure configuration can be a dynamically configurable antenna. For example, the multi-wirelessly chargeable battery apparatus may include one or more controllers that monitor the antennas and dynamically configure which antennas provide optimal power reception.

Figure 12:
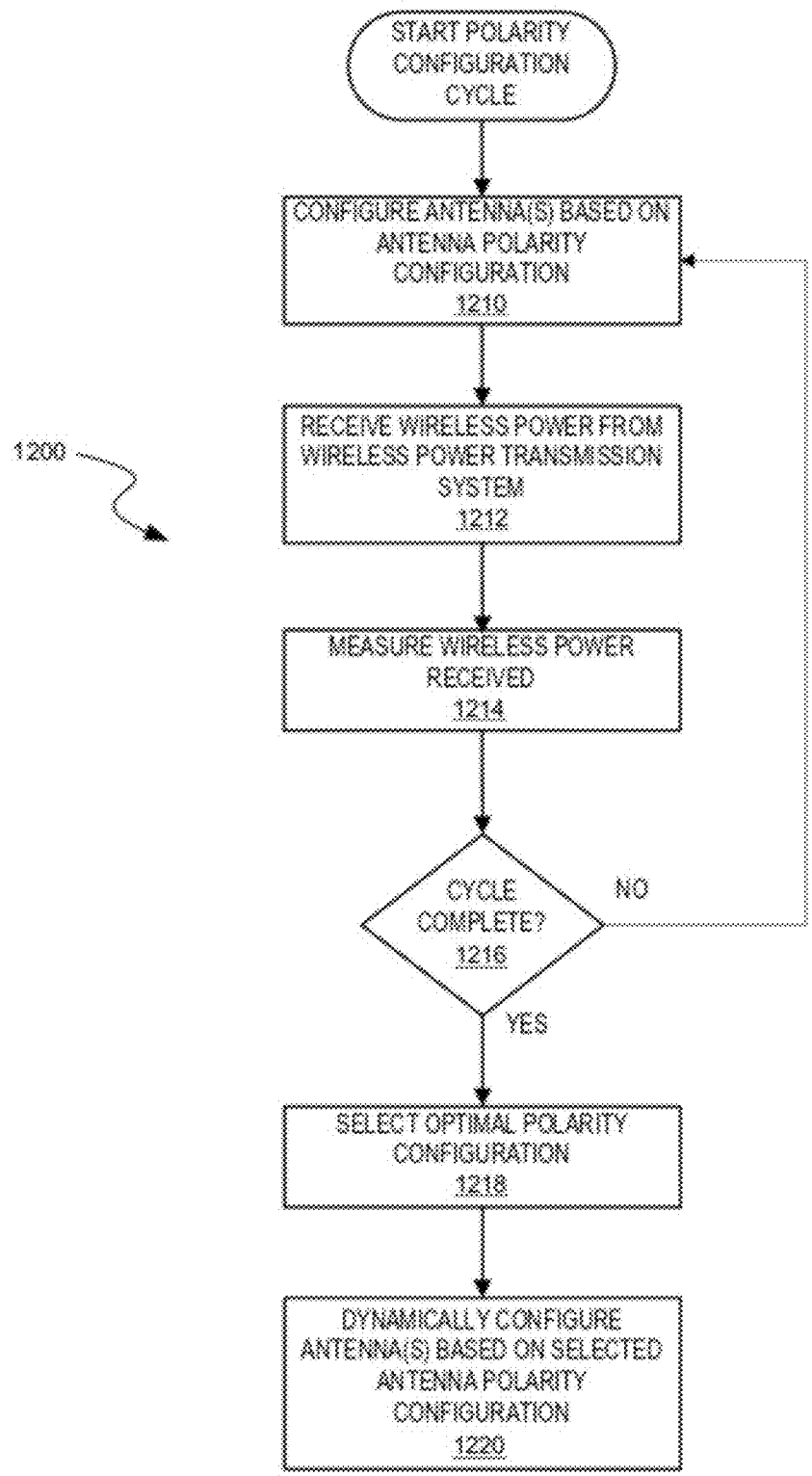
FIG. 12 depicts flow diagrams illustrating an example process for dynamically selecting an optimal antenna polarity, according to some embodiments.

FIG. 12 depicts flow diagrams illustrating an example process 1200 for dynamically selecting an optimal antenna polarity, according to some embodiments. More specifically, the example of FIG. 12 illustrates an example polarity configuration cycle whereby the optimal antenna polarity can be determined and configured. A wirelessly chargeable battery apparatus can, among other functions, perform the corresponding steps of example process 1200. The wirelessly chargeable battery apparatus can be wirelessly chargeable battery apparatus 500 of FIGS. 5A and 5B, although alternative configurations are also possible.

To begin, at step 1210, the wirelessly chargeable battery apparatus configures the antenna(s) based on a first of multiple antenna polarity configurations or modes. Initially, the wirelessly chargeable battery apparatus configures the antenna polarity to a "default" or base mode. As discussed herein, the wirelessly chargeable battery apparatus includes one or more antennas having configurable polarity. In some embodiments, the polarity is configured by adjusting, e.g., activating or deactivating, antenna feeds or different antennas.

At step 1212, the wirelessly chargeable battery apparatus receives power from a wireless power transmission system, e.g., wireless charger. At step 1214, the wirelessly chargeable battery apparatus processes the received wireless power and measures a quantity or amount of wireless power received. Alternatively, or additionally, the wirelessly chargeable battery apparatus may measure the signal strength of the received wireless power signals. In some embodiments, the wirelessly chargeable battery apparatus saves and/or otherwise stores the measured power or signal strength measurement in conjunction with the antenna polarity mode.

At decision step 1216, the wirelessly chargeable battery apparatus determines if the wirelessly chargeable battery apparatus has cycled through each of the antenna polarity modes. If not, the process continues at step 1210 with the wirelessly chargeable battery apparatus configuring the next antenna polarity configuration. However, if the wirelessly chargeable battery apparatus has cycled through each of the antenna polarity modes, at step 1218, the wirelessly chargeable battery apparatus selects an optimal polarity configuration or antenna polarity mode. As discussed herein, the optimal antenna polarity is the polarity at which the wirelessly chargeable battery apparatus receives the most wireless power or the strongest signal from one or more chargers within a wireless power delivery environment. Lastly, at step 1220, the antennas are configured based on the selected antenna polarity configuration if they are not already configured in the selected mode.

FIGS. 13A-13D illustrate various views of an example client (wireless power receiver) packaged in a standard battery form factor, according to some embodiment. More specifically, the examples of FIGS. 13A-13D illustrate front perspective, top, bottom and side views, respectively, of an example client (wireless power receiver) packaged in a standard AA type battery form factor. As described herein, the client (wireless power receiver) can be packaged in any standard battery form factor including, cylindrical and non-cylindrical cells or batteries, camera batteries, button cells, etc. By way of example, the example client (wireless power receiver) can be packaged in AA, AAA, C, D, 4.5-vot, 9-volt, Lantern (spring), etc.

One challenge with retrofitting the wireless charging functionality into existing wireless devices is that each wireless device can have a different multi-battery configuration. In some instances, a single battery with integrated wireless charging functionality can be utilized with a dummy cell for a device requiring two batteries (e.g. two AA batteries). However, the multi-battery configurations can require different voltages depending on the type of battery, the number of batteries, and the configuration (e.g., number of batteries in parallel and number of batteries in series).

FIGS. 14A-14D illustrate various examples of multi-battery configurations, according to some embodiments. As discussed above, each wireless device can have different multi-battery configurations requiring different voltage to power the wireless device. By way of example, FIG. 14A illustrates a standard AA cell 1.5V battery. FIGS. 14B and 14C illustrate two configurations of two side-by-side standard AA cell 1.5V batteries where the positive and negative contacts do not align and where they do, respectively. Lastly, FIG. 14D illustrates an example of two standard AA cell 1.5V batteries in series where the configuration provides 3 Volts when measured end-to-end.

Figure 15:
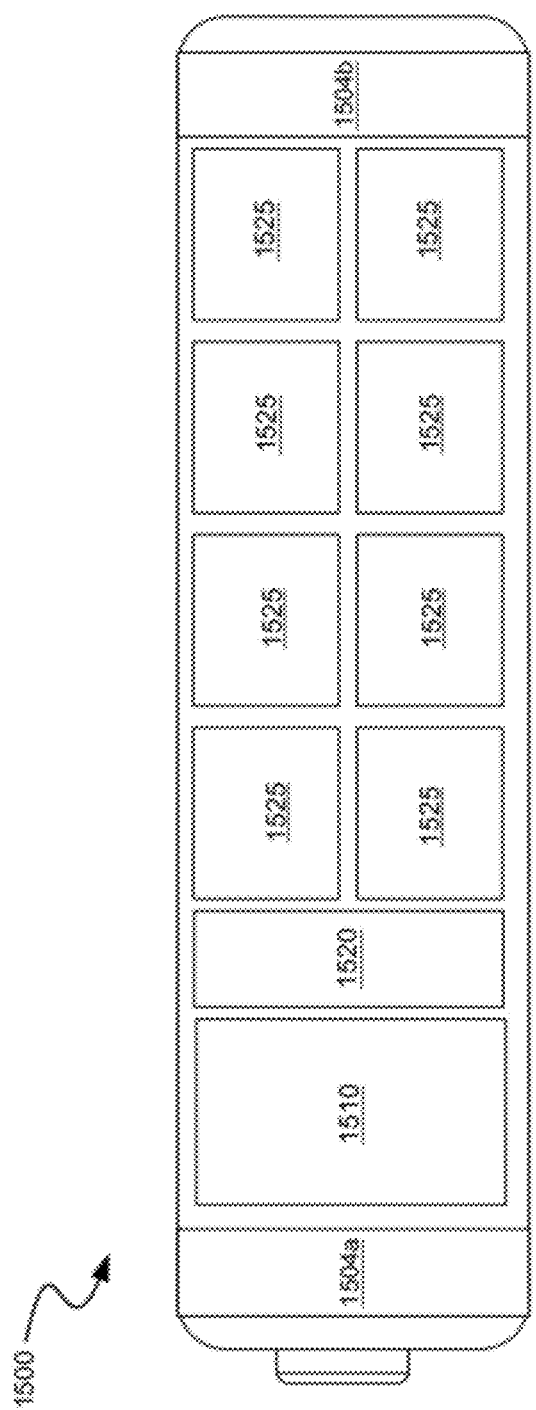
FIG. 15 is a diagram illustrating an example battery with integrated wireless charging functionality and variable output voltage, according to an embodiment.

FIG. 15 is a diagram illustrating an example battery 1500 with integrated wireless charging functionality and variable output voltage, according to an embodiment. The example battery 1500 includes antennas 1504a and 1504b, wireless power receiver circuitry (e.g., a client) 1510, and voltage configuration module 1520, and multiple storage cells 1525. In some embodiments, the output voltage of the example battery 1500 can vary based on the configuration of the storage cells 1525. The storage cells 1525 can be configurable and/or reconfigurable by a voltage configuration module 1520. The wireless power receiver circuitry (e.g., a client) 1510 can include one or more of the components of a client (wireless power receiver), as described herein.

In some embodiments, the voltage configuration module 1520 can automatically configure the voltage based on information received from dummy cells. Alternatively, the voltage configuration module 1520 can be configurable/reconfigurable by a user. Other methods of configuration are also possible.

Figure 16A:
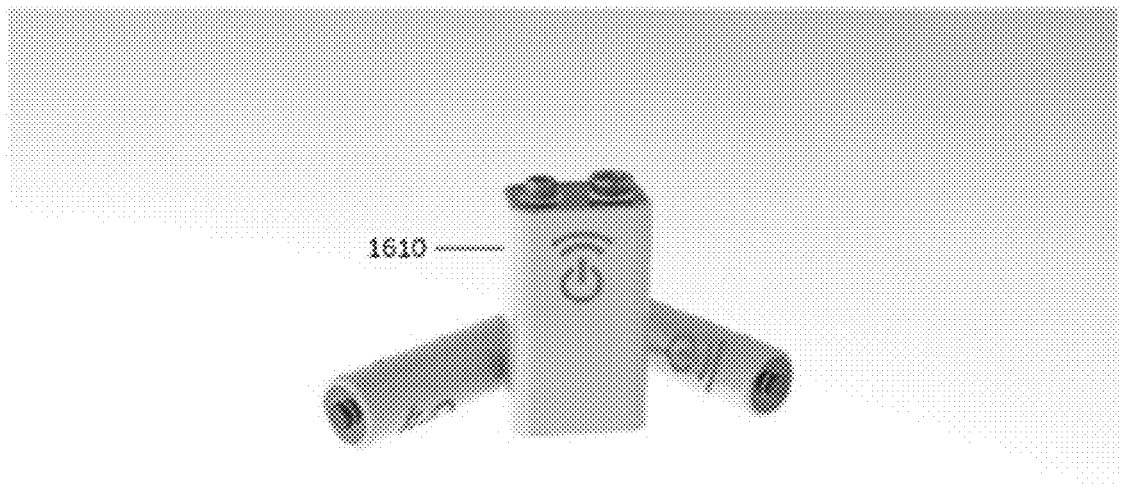
FIGS. 16A and 16B illustrate an example battery having an integrated wireless charging module and one or more storage cells in a storage module.
Figure 16B:
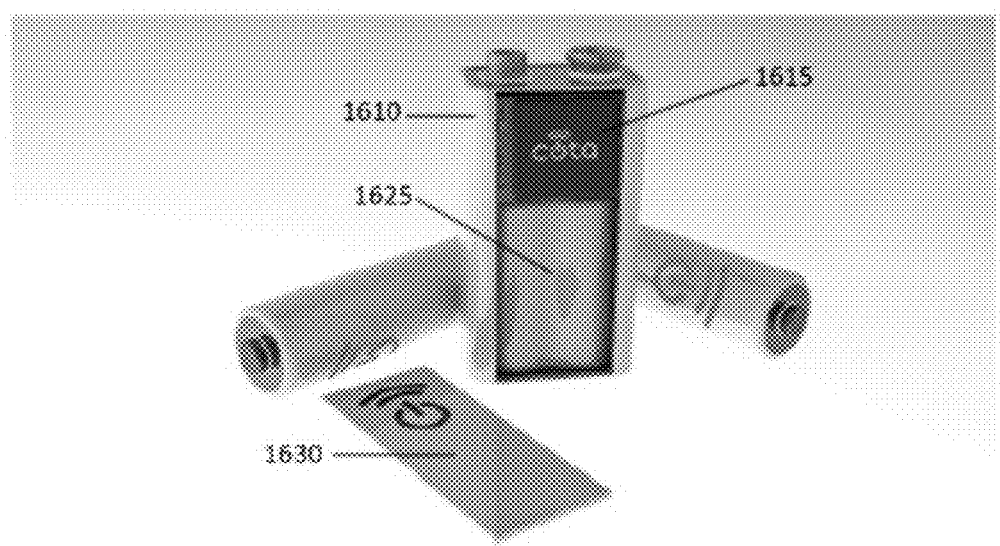

FIGS. 16A and 16B illustrate an example battery 1610 having an integrated wireless charging module 1615 and one or more storage cells in a storage module 1625. According to the examples of FIGS. 16A and 16B, the wireless charging module 1615 and the storage module 1625 can be packaged in a 9-Volt battery. A front cover 1630 snaps into the base to keep the components in the 9-Volt battery package. In some embodiments, these components can be removable and/or replaceable.

In some embodiments, multi-battery configurations can include multiple batteries integrated with wireless charging functionality. The multi-battery configurations can include multiple batteries with one or more integrated with wireless charging functionality and one or more comprising batteries that are chargeable/rechargeable via the one or more integrated with the wireless charging functionality.

IV. Example Systems

Figure 17:
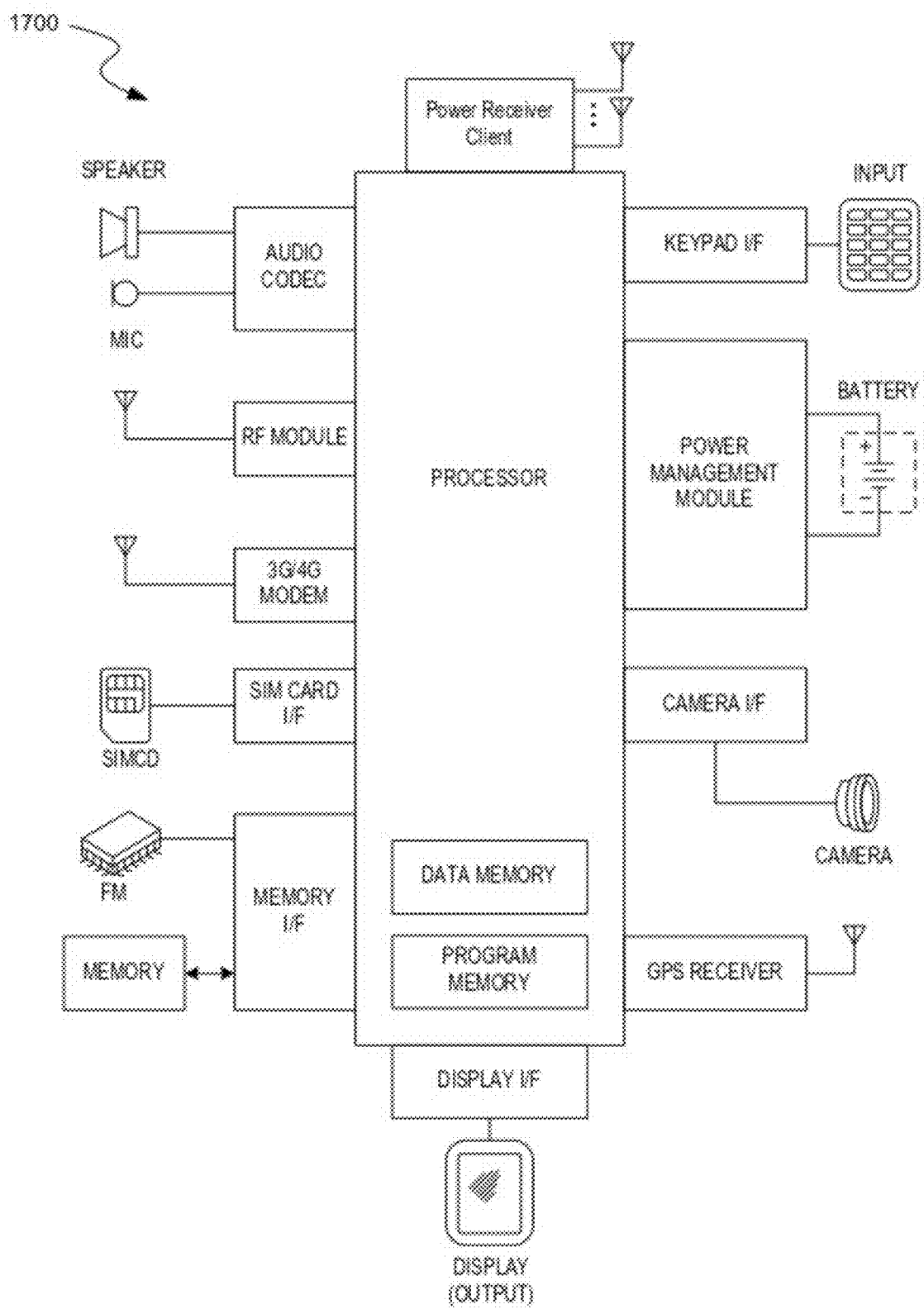
FIG. 17 depicts a block diagram illustrating example components of a representative mobile device or tablet computer with a wireless power receiver or client in the form of a mobile (or smart) phone or tablet computer device, according to some embodiments.

FIG. 17 depicts a block diagram illustrating example components of a representative mobile device or tablet computer 1700 with a wireless power receiver or client in the form of a mobile (or smart) phone or tablet computer device, according to an embodiment. Various interfaces and modules are shown with reference to FIG. 17, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the PCB.

The wireless power receiver client can be any of the power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 18:
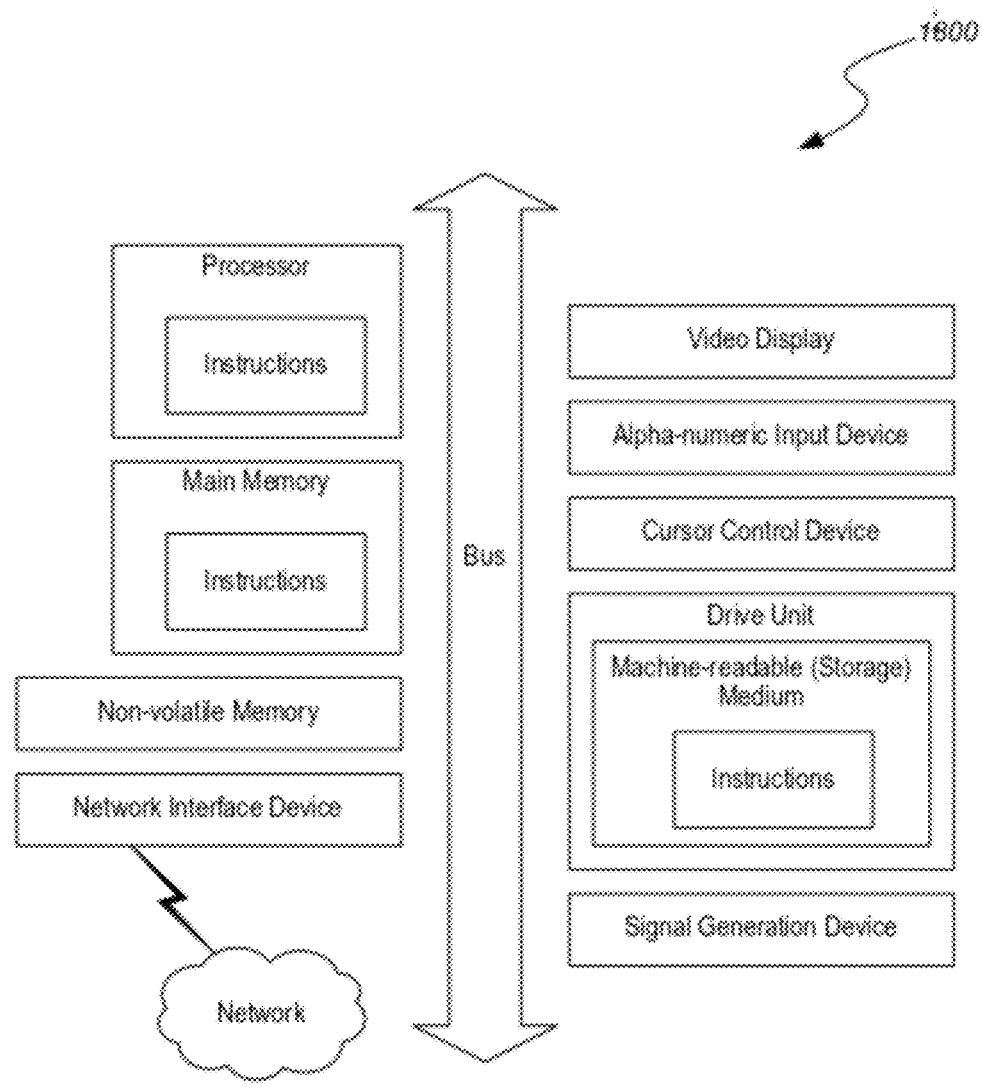
FIG. 18 depicts a diagrammatic representation of a machine, in the example form, of a computer system within which a set of instructions, for causing the machine to perform any one or more of the methodologies discussed herein, may be executed.

FIG. 18 depicts a diagrammatic representation of a machine, in the example form, of a computer system within which a set of instructions, for causing the machine to perform any one or more of the methodologies discussed herein, may be executed.

In the example of FIG. 18, the computer system 1800 includes a processor, memory, non-volatile memory, and an interface device. Various common components (e.g., cache memory) are omitted for illustrative simplicity. The computer system 1800 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 18 reside in the interface.

In operation, the computer system 1800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium (any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. An enclosure for a wirelessly chargeable battery, the enclosure comprising:
   a housing having a base and an open end opposite the base, the base having a first surface and a second surface, wherein the first surface of the base faces the open end of the housing, and wherein the base includes a hole bored therethrough;
   an end piece attached to the housing proximal to the base and having an open end positioned opposite the second surface of the base; and
   an antenna attached to or formed on at least one of: an interior surface, and an exterior surface, of at least one of: the housing, and the end piece.

2. The enclosure of claim 1, wherein the housing, the base, and the end piece are formed as a one-piece construction.

3. The enclosure of claim 1, wherein the antenna is further attached to or formed on an interior surface of the hole bored through the base.

4. The enclosure of claim 1, wherein the antenna is further attached to or formed on an exterior surface of the open end of the housing opposite the first surface of the base.

5. The enclosure of claim 1, wherein the antenna is further attached to or formed on an exterior surface of the open end of the end piece opposite the second surface of the base.

6. The enclosure of claim 1, wherein the antenna is attached to or formed on the interior surface of the end piece, and wherein the antenna is electrically connected to one or more components positioned inside of the housing via at least one elastomeric connection.

7. The enclosure of claim 1, wherein the antenna includes at least two electrically isolated antenna portions.

8. The enclosure of claim 1, further comprising a plurality of directors positioned on the exterior surface of at least one of: the housing, and the end piece.

9. The enclosure of claim 1, wherein at least one of the housing, and the end piece, is constructed of a radio frequency transparent material.

10. A wirelessly chargeable battery apparatus, the apparatus comprising:
- a housing having a base and an open end opposite the base, the base having a first surface and a second surface, wherein the first surface of the base faces the open end of the housing, and wherein the base includes a hole bored therethrough;
- an end piece attached to the housing proximal to the base and having an open end positioned opposite the second surface of the base;
- an antenna attached to or formed on at least one of: an interior surface, and an exterior surface, of the housing and the end piece;
- at least one battery cell positioned in a first cavity defined by the housing and the first surface of the base; and
- circuitry positioned in a second cavity defined by the end piece and the second surface of the base, wherein the circuitry is connected to the at least one battery cell.

11. The wirelessly chargeable battery apparatus of claim 10, wherein the circuitry is connected to the at least battery cell by a wired connection extending from the first cavity through the hole to the second cavity.

12. The wirelessly chargeable battery apparatus of claim 10, further comprising:
- a first cap attached to an exterior surface of the open end of the housing opposite the first surface of the base; and
- a second cap attached to an exterior surface of the open end of the end piece opposite the second surface of the base,
- wherein the first cap encloses the first cavity, and wherein the second cap encloses the second cavity.

13. The wirelessly chargeable battery apparatus of claim 10, wherein the antenna includes at least two electrically isolated antenna portions.

14. The wirelessly chargeable battery apparatus of claim 10, wherein the antenna includes a dipole-inspired antenna.

15. The wirelessly chargeable battery apparatus of claim 10, wherein the antenna includes a monopole-inspired antenna.

16. The wirelessly chargeable battery apparatus of claim 10, further comprising a radiator including a circularly polarized antenna.

17. The wirelessly chargeable battery apparatus of claim 10, further comprising a plurality of conductor strips or planes positioned on the exterior surface of at least one of: the housing, and the end piece.

18. The wirelessly chargeable battery apparatus of claim 10, wherein the circuitry is distributed across a plurality of stacked and connected printed circuit board (PCB) pieces.

19. The wirelessly chargeable battery apparatus of claim 18, wherein at least one of the PCB pieces is a flexible PCB piece.

20. A method for manufacturing a wirelessly chargeable battery apparatus, the method comprising:
- forming an enclosure including a first interior cavity separated from a second interior cavity by a base;
- boring a hole through a portion of the base to provide access between the first and second cavities; and
- integrating an antenna into or onto at least one of: an interior surface, and an exterior surface, of the enclosure.

21. The method of claim 20, wherein the step of integrating an antenna comprises at least one of:
- coating an interior surface of the first cavity with a conductor; and
- coating an interior surface of the second cavity with the conductor.

22. The method of claim 20, wherein the step of integrating an antenna comprises:
- first coating an interior surface of the first cavity with a conductor; and
- second coating an interior surface of the second cavity with the conductor,
- wherein, after the first coating and the second coating steps, the first coating is electrically isolated from the second coating.

23. The method of claim 20, further comprising:
positioning at least one battery cell in the first cavity;
positioning circuitry in the second cavity; and
connecting the at least one battery cell to the circuitry using a wired connection extending through the hole from the first cavity to the second cavity.

24. The method of claim 23, wherein the circuitry includes a printed circuit board (PCB), the method further comprising coupling the antenna and the PCB via one or more elastomeric radio frequency connections.

* * * * *